(12) United States Patent
Chen

(10) Patent No.: US 11,918,004 B1
(45) Date of Patent: Mar. 5, 2024

(54) ANTICAKING COMPOSITIONS FOR DIVIDED CHEESE

(71) Applicant: Allied Blending LP, Keokuk, IA (US)

(72) Inventor: Jingfan Chen, Keokuk, IA (US)

(73) Assignee: Allied Blending LP, Keokuk, IA (US)

( * ) Notice: Subject to any disclaimer, the term of this patent is extended or adjusted under 35 U.S.C. 154(b) by 0 days.

(21) Appl. No.: 18/168,866

(22) Filed: Feb. 14, 2023

Related U.S. Application Data

(60) Provisional application No. 63/371,272, filed on Aug. 12, 2022.

(51) Int. Cl.
| | |
|---|---|
| A23C 19/16 | (2006.01) |
| A23C 19/09 | (2006.01) |
| A23C 19/093 | (2006.01) |
| A23C 19/10 | (2006.01) |

(52) U.S. Cl.
CPC .......... *A23C 19/10* (2013.01); *A23C 19/0917* (2013.01); *A23C 19/0921* (2013.01); *A23C 19/093* (2013.01); *A23C 2240/15* (2013.01); *A23C 2250/15* (2013.01)

(58) Field of Classification Search
CPC . A23C 19/10; A23C 19/0917; A23C 19/0921; A23C 19/093; A23C 2240/15; A23C 2250/15
USPC .......................................................... 426/96
See application file for complete search history.

(56) References Cited

U.S. PATENT DOCUMENTS

| | | | |
|---|---|---|---|
| 5,626,893 A * | 5/1997 | Reddy ..................... | A23L 7/198 426/582 |
| 2016/0213051 A1* | 7/2016 | Stork ..................... | A23C 19/10 |
| 2019/0059407 A1* | 2/2019 | Patel ................... | A23C 19/0917 |

OTHER PUBLICATIONS

Rutkowska et al., Novel insight into biological activity and phytochemical composition of *Sorbus aucuparia* L. fruits: Fractionated extracts as inhibitors of protein glycation and oxidative/nitrative damage of human plasma components, Food Research International. (Year: 2021).*

Bobinaite, R. et al., "Chemical composition, antioxidant, antimicrobial and antiproliferative activities of the extracts isolated from the pomace of rowanberry (*Sorbus aucuparia* L.)", Science Direct, 136, Abstract, (2020).

Kure, C.F. et al., "The fungal problem in cheese industry", Current Opinion in Food Science, 29:14-19, (2019).

Muñoz-Tebar, N. et al., "Biological Activity of Extracts from Aromatic Plants as Control Agents against Spoilage Molds Isolated from Sheep Cheese", Foods, 10(1576), 18 pages, (2021).

Rutkowska, M. et al., "Novel insight into biological activity and phytochemical composition of *Sorbus aucuparia* L. fruits: Fractionated extracts as inhibitors of protein glycation and oxidative/nitrative damage of human plasma components", Food Research International, 147(110526): 1-13, (2021).

(Continued)

*Primary Examiner* — Brent T O'Hern
(74) *Attorney, Agent, or Firm* — Husch Blackwell LLP

(57) ABSTRACT

The present disclosure provides anticaking agents for cheese, comprising an botanical extract from *Sorbus*, such as *Sorbus aucuparia*. Also provided are anticaking agents for cheese, comprising 15-30 wt. % reducing sugar, 0.2-0.8 wt. % glucose oxidase, 0-2 wt. % salt chosen from sodium chloride, calcium chloride, and magnesium chloride, and 0.5-10 wt. % botanical extract. The present disclosure further provides food products comprising these anticaking agents and methods of treating divided cheese for anticaking with these anticaking agents.

18 Claims, 10 Drawing Sheets

(56) References Cited

OTHER PUBLICATIONS

Srimahaeak, T. et al., "Spoilage Potential of Contaminating Yeast Species *Kluyveromyces marxianus, Pichia kudriavzevii* and *Torulaspora delbrueckii* during Cold Storage of Skyr", Foods, 11(1776), 18 pages, (2022).
Agoramoorthy, G., et al., "Antibacterial and antifungal activities of fatty acid methyl esters of the blind-your-eye mangrove from India", Br J Microbiol., 38:739-42, (2007).
Akula, S. et al., "Antifungal efficacy of lauric acid and caprylic acid—Derivatives of virgin coconut oil against Candida albicans", Biomed Biotech Res J., 5(2):229-34, (2021).
Bobinaité, R. et al., "Recovery of bioactive substances from rowanberry pomace by consecutive extraction with supercritical carbon dioxide and pressurized solvents", J Ind Engin Chem., 85:152-60, (2020).
Chadeganipour, M. et al., "Antifungal activities of pelargonic and capric acid on Microsporum gypseum", Mycoses, 44(3-4):109-12, (2001).
De Araújo Cavalcante, W. et al., "Anaerobic fermentation for n-caproic acid production: A review", Process Bioch., 54:106-19, (2017).
Djami-Tchatchou, A. et al., "Similar, but different: structurally related azelaic acid and hexanoic acid trigger differential metabolomic and transcriptomic responses in tobacco cells", BMC Plant Biol., 17(1):227, pp. 1-15, (2017).
Fukui, H. et al., "Structures of plant growth inhibitors in seeds of *Cucurbita pepo* L", Agric Biol Chem., 41(1):189-94, (1977).
Goetzl, E. et al., "Vitamin E modulates the lipoxygenation of arachidonic acid in leukocytes", Nature, 288 (5787):183-5, (1980).
Groenewald, E. et al., "Prostaglandins and related substances in plants", Botanical Rev., 63:199-220, (1997).
Huang, C. et al., "Short- and medium-chain fatty acids exhibit antimicrobial activity for oral microorganisms", Arch Oral Biol., 56(7):650.4, (2011).
Huang, W. et al., "Anti-bacterial and anti-inflammatory properties of capric acid against Propionibacterium acnes: a comparative study with lauric acid", J Dermatol Sci., 73(3):232-40, (2014).
Hübke, H. et al., "Characterization and quantification of free and esterified 9- and 13-hydroxyoctadecadienoic acids (HODE) in barley, germinating barley, and finished malt", J Agric Food Chem., 53(5):1556-62, (2005).
Kimura, H. et al., "Characterization of metabolic pathway of linoleic acid 9-hydroperoxide in cytosolic fraction of potato tubers and identification of reaction products", Appl Biochem Biotechnol., 118(1-3):115-32, (2004).
Kobayashi, Y. et al., "Suppressive effects of a plant-origin polyol, dulcitol on collagen-induced arthritis in mice", Nihon Yakurigaku Zasshi., 110(Suppl 1):132P-137P, (1997).
Kumar, N. et al., "15-Lipoxygenase metabolites of a-linolenic acid,[13-(S)-HPOTrE and 13-(S)-HOTrE], mediate anti-inflammatory effects by inactivating NLRP3 inflammasome", Scientific rep., 6(1):31649, pp. 1-14, (2016).
Lebiedzińcska, A. et al., "Reversed-phase high-performance liquid chromatography method with coulometric electrochemical and ultraviolet detection for the quantification of vitamins B1 (thiamine), B6 (pyridoxamine, pyridoxal and pyridoxine) and B12 in animal and plant foods", J Chromatogr A., 1173(1-2):71-80, (2007).
Levin, G. et al., "Differential metabolism of dihomo-gamma-linolenic acid and arachidonic acid by cyclo-oxygenase-1 and cyclo-oxygenase-2: implications for cellular synthesis of prostaglandin E1 and prostaglandin E2", Biochem J., 365(Pt 2):489-96, (2002).
Lindstedt, S. et al., "Studies on the metabolism of lysine and 5-hydroxylysine", Arch Biochem Biophys., 119(1):336-46, (1967).
Navarro, C. et al., "Influence of polyunsaturated fatty acids on Cortisol transport through MDCK and MDCK-MDR1 cells as blood-brain barrier in vitro model", Eur J Pharm Sci., 42(3):290-9, (2011).
Ong, E. et al., "Valorization of avocado seeds with antioxidant capacity using pressurized hot water extraction", Sci Rep., 12(1):13036, (2022).
Pail, M. et al., "The metabolic role and evolution of L-arabinitol 4-dehydrogenase of Hypocrea jecorina", EurJ Biochem., 271(10), 1864-72, (2004).
Proctor, K. et al., "Intestinal vasodilation by epoxyeicosatrienoic acids: arachidonic acid metabolites produced by a cytochrome P450 monooxygenase", Circ Res., 60(1):50-9, (1987).
Raghavendra, S. et al., "Effect of different treatments for the destabilization of coconut milk emulsion", J Food Engin., 97(3):341-7, (2010).
Strassman, M. et al., "Enzymatic Formation of a-Isopropylmalic Acid, an Intermediate in Leucine Biosynthesis", J Biol Chem, 238(7):2445-52, (1963).
Walters, D. et al., "Antifungal activities of four fatty acids against plant pathogenic fungi", Mycopathologia, 157(1):87-90, (2004).
Wierzbicki, A., "Peroxisomal disorders affecting phytanic acid a-oxidation: a review", Biochem Soc Trans., 35(5):881-6, (2007).
Wróblewska, A. et al., "The Studies on a-Pinene Oxidation over the TS-1. The Influence of the Temperature, Reaction Time, Titanium and Catalyst Content", Materials, 14(24):7799, (2021).
Zoeller, M. et al., "Lipid Profiling of the Arabidopsis Hypersensitive Response Reveals Specific Lipid Peroxidation and Fragmentation Processes: Biogenesis of Pimelic and Azelaic Acid", Plant Physiol., 160(1):365-78, (2012).

\* cited by examiner

ANTICAKING COMPOSITIONS FOR DIVIDED CHEESE

This application claims the benefit of priority of U.S. Provisional Patent Application Ser. No. 63/371,272 filed Aug. 12, 2022, the disclosure of which is incorporated by reference in its entirety for all purposes.

The present disclosure relates to anticaking compositions containing a natural antimicrobial.

Food is preserved in various ways, including pickling, salting, curing, smoking, freezing, and drying. Sometimes, chemical preservatives are added to inhibit or block the growth of microbes, such as yeast and bacteria. For example, in current manufacturing practice, sorbic acid or its salt is melted into processed cheese slices when it is being processed or is sprinkled on the surface of shredded cheese. A natural source of sorbic acid is the rowan tree, whose genus is Sorbus, including the European rowan, Sorbus aucuparia.

There remains a need to preserve food naturally without artificial preservatives and provide clean labeling approved by government authorities. No botanical extract of Sorbus has been used previously in an anticaking agent. While a botanical extract has been developed for bakery applications, experimental testing on an anticaking agent showed that its effects are comparable or superior to natamycin when applied to a divided cheese. As such, in the anticaking compositions disclosed herein, natamycin is excluded. These products are all-natural.

The present disclosure provides an anticaking agent for cheese, comprising a botanical extract from Sorbus.

The present disclosure provides a food product comprising a divided cheese comprising a plurality of individual cheese particles, and an anticaking agent disclosed herein dispersed on the plurality of individual cheese particles in an amount sufficient to inhibit caking of the plurality of individual cheese particles. In certain embodiments, the anticaking agent is applied at between 1 wt. % and 6 wt. % of the divided cheese.

The present disclosure also provides a method of treating divided cheese for anticaking, comprising dispersing an anticaking agent disclosed herein over a divided cheese.

BRIEF DESCRIPTION OF THE DRAWINGS

The disclosure will be readily understood by the following detailed description in conjunction with the accompanying drawings, wherein like reference numerals designate like structural elements. The drawings provide exemplary embodiments or aspects of the disclosure and do not limit the scope of the disclosure.

DETAILED DESCRIPTION

Figure 1:
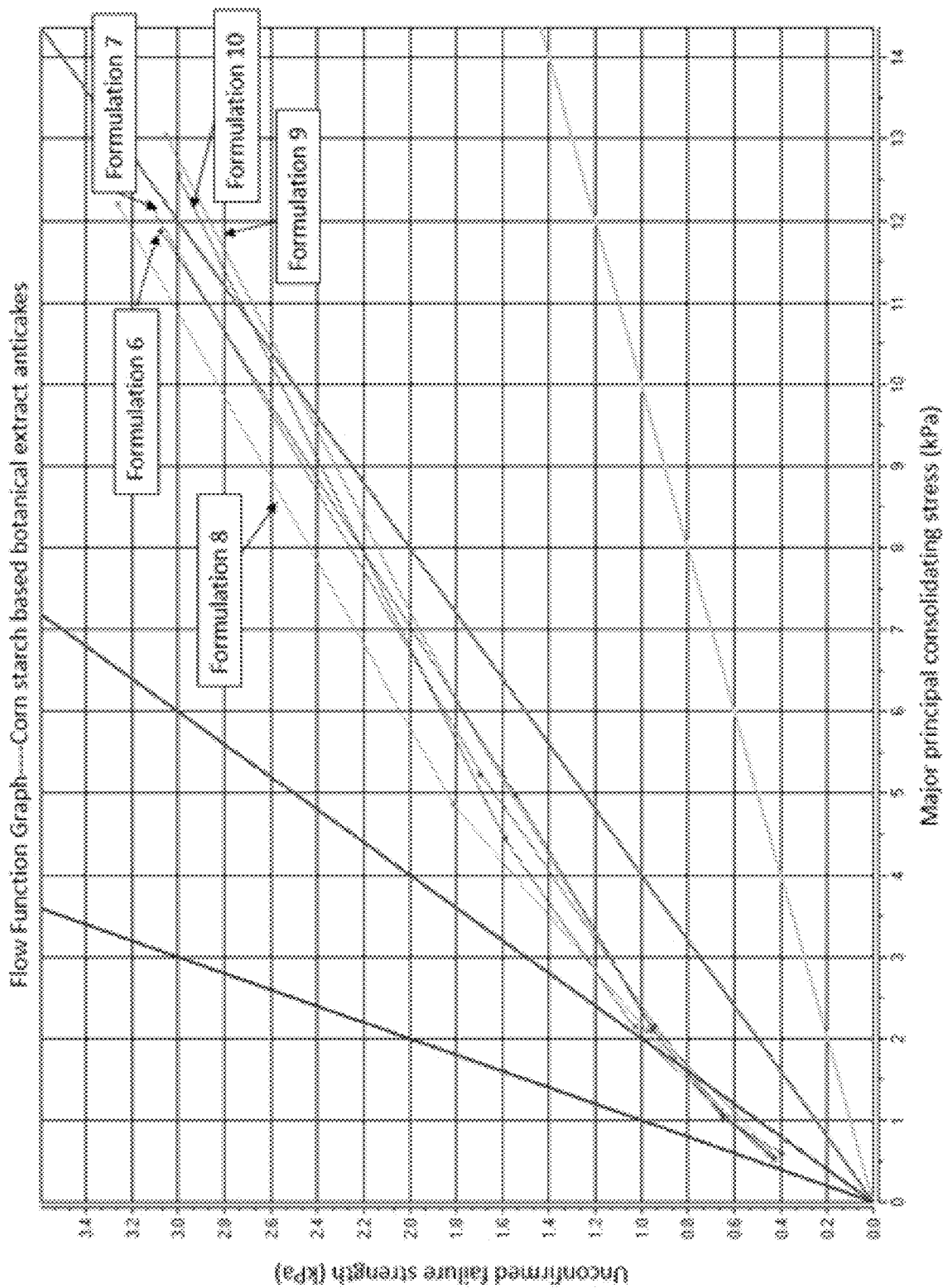
FIG. 1 shows the flow function graph of potato-starch-based (PSB), botanical-extract-containing anticaking agents.
Figure 2:
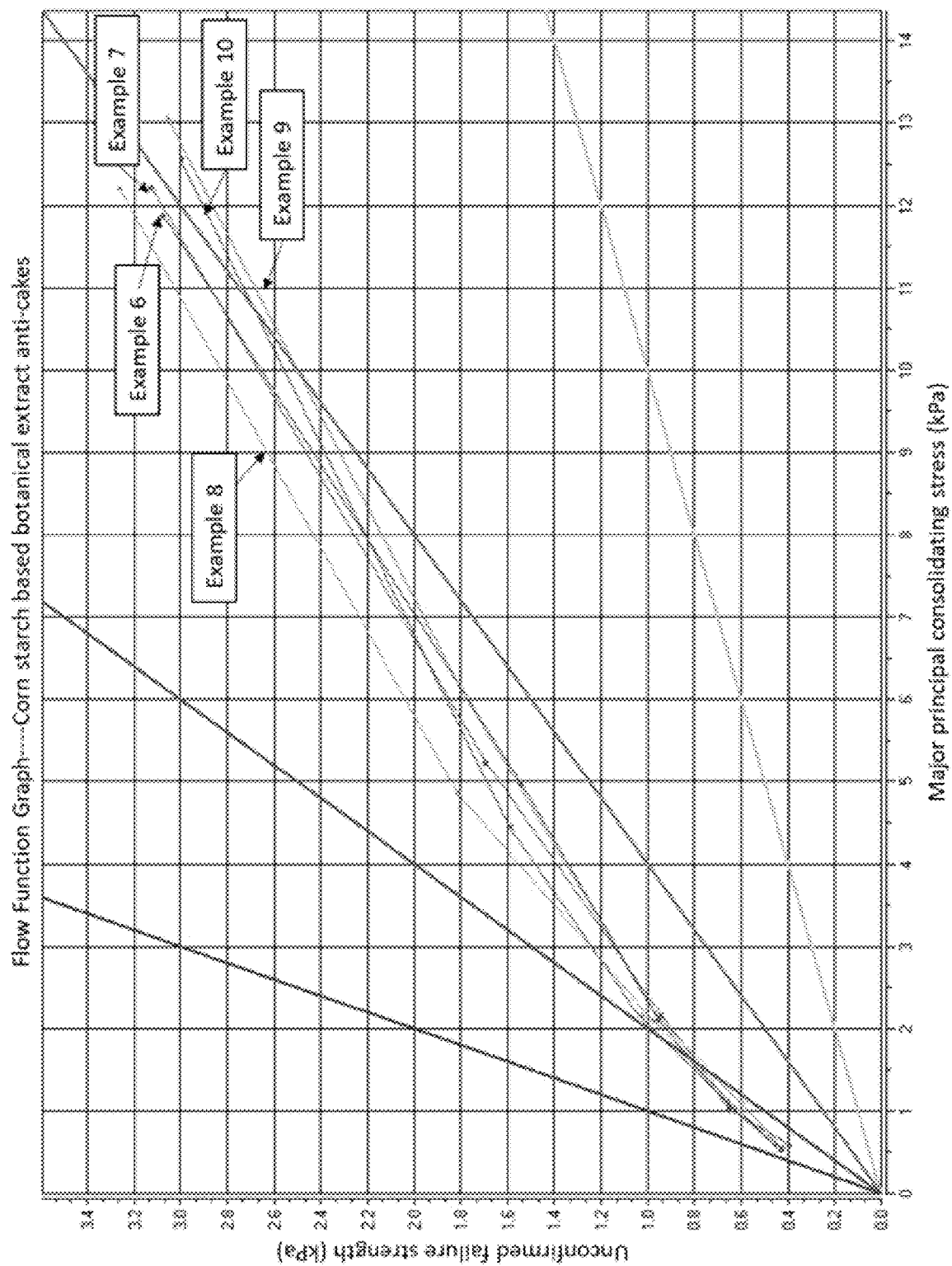
FIG. 2 shows the flow function graph of corn-starch-based (CSB), botanical-extract-containing anticaking agents.
Figure 3:
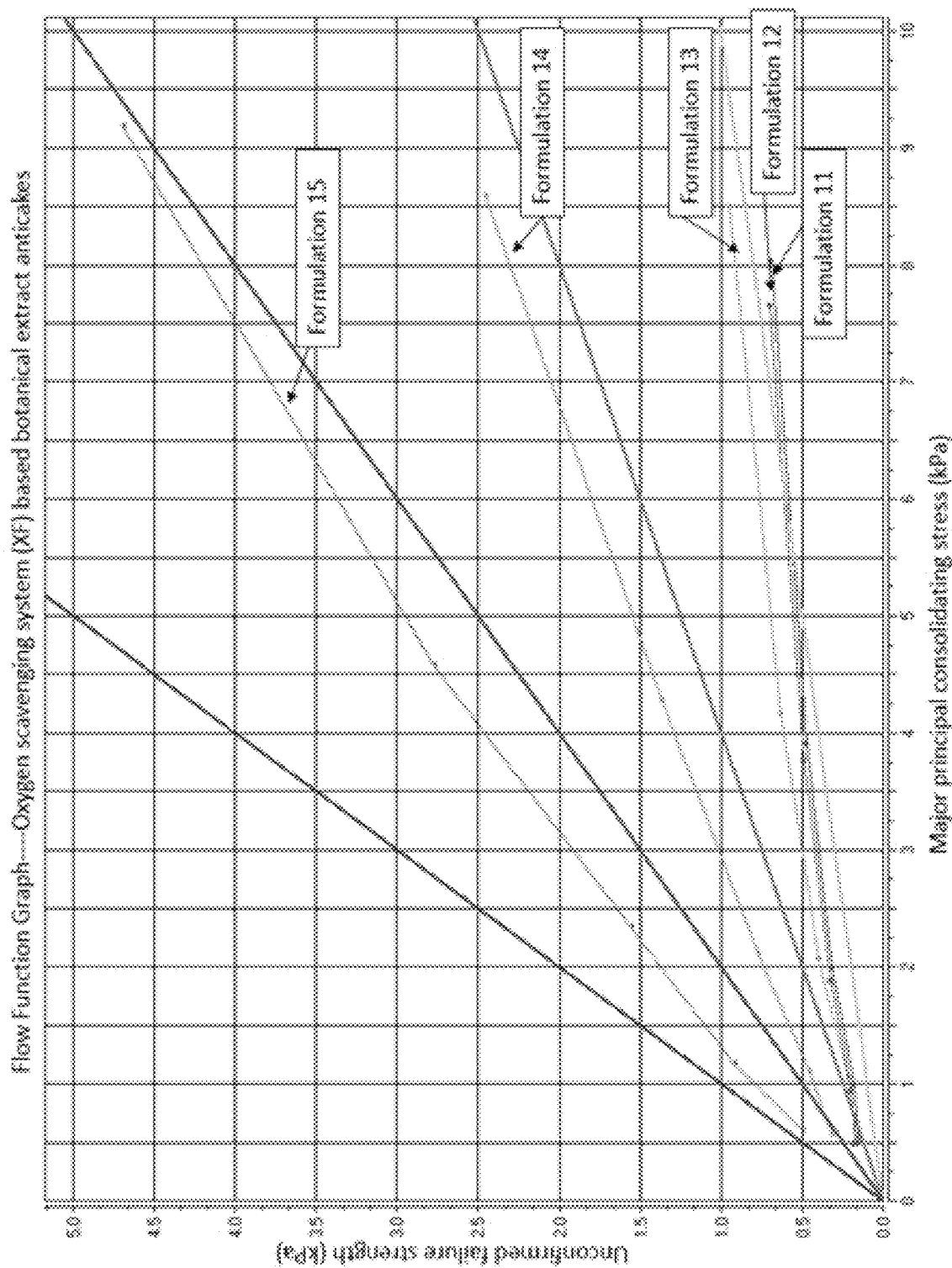
FIG. 3 shows the flow function graph of PSB-oxygen-scavenging-system-based (OSS), botanical-extract-containing anticaking agents.
Figure 4:
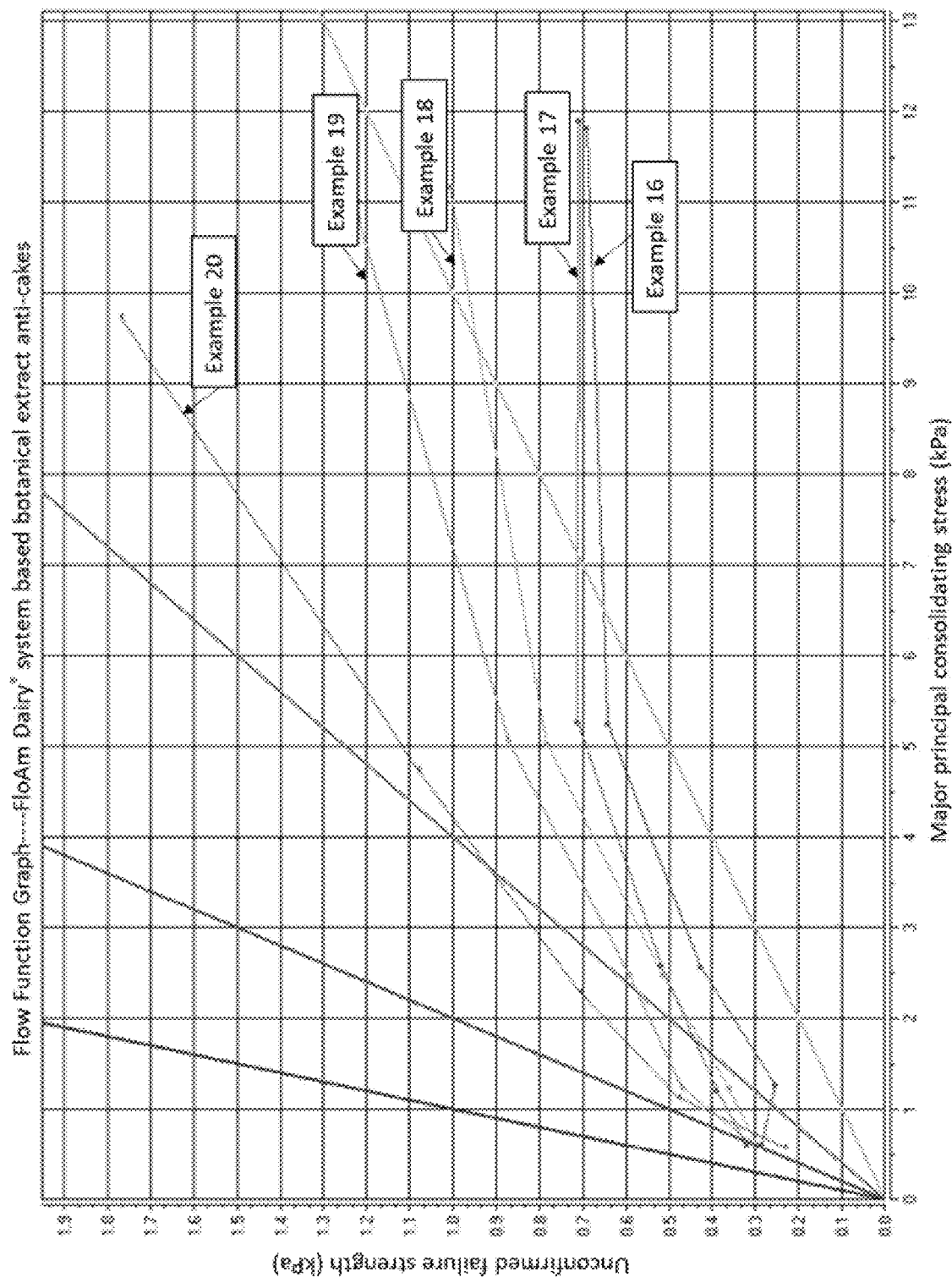
FIG. 4 shows the flow function graph of FloAm Dairy® system-based (FAD) botanical-extract-containing anticaking agents.

"Anticaking agent," "anticaking composition," or, simply, "anticake," in the food industry, especially in the dairy and cheese industry, is defined as any safe and suitable food ingredient that, when added, should prevent lumping of shredded, diced, or chunked dairy products, such as cheese, during storage at room temperature or refrigerator or freezer. The anticaking agents described herein may also comprise an oxygen-scavenging system that establishes and maintains a low-oxygen environment to promote easy packaging, freshness, and protection against spoilage and pathogenic microbes. Such a dairy product with an anticaking agent is easy to handle when applied to the final food product. Some cheeses, after they are chunked and if the anticaking agent is not used, will be difficult to handle and spoil quickly without refrigeration. This is a problem, especially with high moisture and high-fat cheeses.

As disclosed herein, the anticaking agent for cheese comprises a botanical extract from Sorbus. The term "botanical extract from Sorbus" is intended to be equivalent to "botanical extract" or "rowanberry extract." The term "extract" refers to a preparation containing an active ingredient of a substance in concentrated form. In certain embodiments, the extract is an oil, an aqueous solution, or a solution comprising one or more solvents other than water, such as ethanol or acetone.

The "botanical extract" is obtained from the berries (i.e., rowanberries) of *Sorbus*, commonly called rowan, mountain-ash, or quickbeam, depending on the species and geographical location. In some embodiments, *Sorbus* is chosen from *Sorbus aucuparia, Sorbus americana, Sorbus aria, Sorbus alnifolia, Sorbus domestica, Sorbus torminalis*, and *Sorbus chamaemespilus*. In certain embodiments, the *Sorbus* is *Sorbus aucuparia*, and a species of deciduous tree or shrub in the rose family native to Europe and Asia. In other embodiments, the *Sorbus* is *Sorbus americana*, also called the American mountain-ash, which is native to eastern North America. In other embodiments, the *Sorbus* is *Sorbus aria*, also called the whitebeam or common whitebeam, which is native to temperate Europe and Asia. In other embodiments, the *Sorbus* is *Sorbus* alnifolia, also called the Korean whitebeam, which is native to temperate northeast Asia. In other embodiments, the *Sorbus* is *Sorbus domestica*, also called the true service tree, which is native to warm-temperate Europe and West Africa. In other embodiments, the *Sorbus* is *Sorbus torminalis*, also called the wild service tree, which is native to temperate Europe, south to the mountains of North Africa and east to the Caucasus ranges. In other embodiments, the *Sorbus* is *Sorbus chamaemespilus*, also known as the false medlar, which is native to the mountains of southern Europe.

The botanical extract comprises many chemical components. Sorbic acid is one of them. It occurs naturally as parasorbic acid in rowanberries. To humans, the rowanberry fruit is bitter, astringent, laxative, diuretic, and a cholagogue. It has vitamin C, preventing scurvy, but the parasorbic acid irritates the gastric mucosa. Parasorbic acid is the lactone of sorbic acid, which opens up upon heating. Traditionally, debittering can be accomplished by freezing, cooking, or drying, which degrades the parasorbic acid.

The content of the botanical extract can vary based on the solvent, method, and source material. In certain embodiments, the botanical extract comprises sorbic acid, parasorbic acid, and a plurality of phenolics, including caffeic and ferulic acids pseudodepsides (such as, prevailing isomers of chlorogenic acid and cynarin), flavanols (mostly quercetin glycosides), flavan-3-ol derivatives (proanthocyanins oligomers and polymers), and simple phenolic acids. Neochlorogenic and chlorogenic acids are the major phenolic compounds. Water extracts comprise higher total proanthocyanins content and demonstrate a highest antioxidant activity than acetone and ethanol extracts.

Extracts isolated from rowanberry pomace effectively inhibit the growth of microorganisms, especially Gram-positive bacteria. Acetone extract was the strongest antimicrobial agent followed by water and ethanol extracts. Acetone and water extracts demonstrated also higher cytotoxic potential in cell viability assays using Caco-2 cells. See Rutkowska et al., "Novel insight into biological activity and phytochemical composition of *Sorbus aucuparia* L. fruits: Fractionated extracts as inhibitors of protein glycation and oxidative/nitrative damage of human plasma components," Food Research International, 147 (2021) 110526, incorporated herein by references in its entirety. Rutkowska reports that the activity of the extracts in the biological model might be also enhanced by the presence of some non-phenolic compounds (e.g., aliphatic acids or vitamins). Taking into account the possible additive and/or synergistic effects, the presence of caffeic acid pseudodepsides, proanthocyanidins, and flavonols, as well as other phenolic and non-phenolic compounds, makes the fruit extracts of *S. aucuparia* promising in the context of their potential application as a functional food ingredient for the prevention of civilization diseases, including diabetes and its cardiovascular complications.

In some embodiments, the botanical extract is a blend of dried, powered *Sorbus* berries mixed with a starch, such as tapioca starch, at a predetermined concentration. Such preparations are commercially available and are suitable for use in the anticaking agents disclosed herein.

In certain embodiments, the anticaking agent comprises 49-94 wt. % starch, 0-1 wt. % mineral oil, 0-1 wt. % silica, and 0.5-20 wt. % botanical extract. In various embodiments, the anticaking agent comprises between 0.5 wt. % and 1 wt. %, between 1 wt. % and 2 wt. %, between 2 wt. % and 3 wt. %, between 3 wt. % and 4 wt. %, between 4 wt. % and 5 wt. %, between 5 wt. % and 6 wt. %, between 7 wt. % and 8 wt. %, between 9 wt. % and 10 wt. %, between 10 wt. % and 11 wt. %, between 11 wt. % and 12 wt. %, between 12 wt. % and 13 wt. %, between 13 wt. % and 14 wt. %, between 14 wt. % and 15 wt. %, between 15 wt. % and 16 wt. %, between 17 wt. % and 18 wt. %, and between 19 wt. % and 20 wt. % botanical extract.

In certain embodiments, the anticaking agent comprises 49-99 wt. % starch, 0-1 wt. % mineral oil, 0-1 wt. % silica, and 0.5-20 wt. % botanical extract. In certain embodiments, the starch in the anticaking agent is chosen from potato starch, corn starch, tapioca starch, and combinations thereof.

"Cheese" refers broadly to all cheeses, including, for example, cheeses defined under the CODEX general Standard for Cheese and under various state and national regulatory bodies. Exemplary classes of cheeses include, but are not limited to, firm/semi-hard cheeses, soft cheeses, analog cheeses, blended cheeses, and pasta filata cheeses, among other types of cheeses.

"Grated cheese" or "divided cheese" is a class of foods prepared by grinding, grating, shredding, or otherwise comminuting cheese of one or more varieties. "Cheese shreds" may be used in place of "grated" to describe alternative cheese forms, where the cheese particles are in the form of cylinders, shreds, or strings. Alternatively, "Chipped" or "chopped" describes cheese particles in the form of chips in the divided cheese.

"Reducing sugars" refers to sugars containing a ketone or aldehyde group that allows the sugar to act as a reducing agent. Reducing sugars include dextrose, D-glucose, D-galactose, maltose, lactose, D-mannose, D-fructose, and D-xylose, among other reducing sugars. "Non-reducing sugars" refer to sugars having their anomeric carbons as part of an acetal (not hemiacetal) functional group. Sucrose is an example of a non-reducing sugar.

"Oxidoreductase enzyme" refers to enzymes that catalyze the reaction between a reducing sugar and oxygen (O2) to form a lactone and hydrogen peroxide. The lactones may hydrolyze over time in aqueous environments to their corresponding aldobionic acids. Examples of oxidoreductase enzymes include hexose oxidase (i.e., D-hexose:oxygen 1-oxidoreductase), glucose oxidase, galactose oxidase, pyranose oxidase, and lactose oxidase, among others. The enzyme may be made by fermenting yeast strains modified to include the oxidoreductase encoding gene. For example, hexose oxidase may be produced by fermentation a selected strain of the yeast *Hansenula polymorpha* modified with the hexose oxidase encoding gene isolated from the algae *Chondrus crispus*.

In certain embodiments, the anticaking agent comprises an oxygen scavenger system, providing the ability to package divided cheese products without a gas flush. The oxygen scavenger system also preserves freshness and prevents microbial growth. When present, the anticaking agent comprises between 0.2 wt. % and 0.8 wt. % oxidoreductase enzyme. The oxygen-scavenging system disclosed herein replaced the gas flushing step in modified atmospheric packaging. The disclosed oxygen-scavenging system can reduce O2 concentrations from atmospheric oxygen (20.9%) to less than about 5% in about 1 to 3 days, such as to less than about 0.5% in about 1 to about 3 days, depending on the type of cheese.

In some embodiments, the oxygen scavenger system combines dextrose and glucose oxidase. In certain embodiments, the anticaking agent comprises 15-30 wt. % dextrose and 0.2-0.8 wt. % glucose oxidase. Using more than 0.4 wt. % glucose oxidase generally did not further increase the oxygen draw-down rate and needlessly increases the cost of manufacturing. In some embodiments, the oxygen scavenger system comprises 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, or 30 wt. % dextrose in combination with 0.2 wt. %, 0.25 wt. %, 0.3 wt. %, 0.35 wt. %, or 0.4 wt. % glucose oxidase. The dextrose may be in a hydrated crystalline form, such as dextrose monohydrate. In certain embodiments, the anticaking agent comprises more than 15 wt. % dextrose. In certain embodiments, the anticaking agent comprises less than 30 wt. % dextrose. More than about 30% dextrose can increase browning during baking. In certain embodiments, the anticaking agent comprises more than 0.2 wt. % glucose oxidase. In certain embodiments, the anticaking agent comprises less than 0.8 wt. % glucose oxidase. In certain embodiments, the anticaking agent comprises less than 0.4 wt. % glucose oxidase.

The present disclosure also provides an anticaking agent comprising 0.5 wt. % and 2 wt. % of a salt. When the salt is added to the glucose oxidase/dextrose oxygen-scavenging system, the rate of oxygen draw-down increases, especially when the salt is sodium chloride. Without wishing to be bound by theory, the salt increased the rate of oxygen draw down by accelerating aerobic respiration in active cultures within the divided cheese product. The salt may also be drawing out more moisture from the divided cheese product, thus providing more water to fuel the oxygen-scavenging system.

In certain embodiments, the anticaking agent comprises between about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, or about 2.0 wt. % salt. In certain embodiments, the salt is chosen from sodium chloride, calcium chloride, potassium chloride, and magnesium chloride. In certain embodiments, the salt is sodium chloride. In certain embodiments, the salt is calcium chloride. In certain embodiments, the salt is potassium chloride. In certain embodiments, the salt is magnesium chloride.

"Dairy ingredient" refers to products or byproducts obtained from processing milk. In certain embodiments, the dairy ingredients consist essentially of one or more constituents of milk, namely, milk proteins, milk fat, lactose, and/or milk minerals. In various embodiments, the dairy ingredient is chosen from milk permeate powder, whey permeate powder, cheese whey powder, sweet dairy whey powder, non-hygroscopic dried whey, acid whey powder, whey protein concentrate, whey protein isolate, milk protein concentrate, milk protein isolate, whey cream, whey protein-lipid concentrate, rennet casein, calcium caseinate, sodium caseinate, milk minerals, milk calcium, milk calcium phosphate, lactose, skim milk powder, non-fat dry milk, acid casein, and combinations thereof. For example, the one or more dairy ingredients may be chosen from milk permeate powder, whey permeate powder, dried whey, and combinations thereof. In certain embodiments, the dairy ingredient is dairy product solids. In certain embodiments, the dairy ingredient is dairy product solids (DPS), which consists essentially of milk permeate powder, whey permeate powder, deproteinized whey, and combinations thereof.

"Non-dairy ingredient" refers to ingredients essentially free from milk components. In various embodiments, the non-dairy ingredient is chosen from starch, cellulose, modified cellulose, calcium sulfate, calcium phosphate, dicalcium phosphate, tricalcium phosphate, silicon dioxide, native starch, modified starch, bentonite, and combinations thereof. In certain embodiments, the one or more non-dairy ingredient is chosen from cellulose, sugarcane fiber, calcium sulfate, calcium phosphate, dicalcium phosphate, silicon dioxide, starch, dextrose monohydrate, glucose oxidase, natamycin, potassium sorbate, mineral oil, high oleic sunflower oil, and combinations thereof.

In certain embodiments, the anticaking agent comprises 1-15 wt. % calcium sulfate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % calcium sulfate. In certain embodiments, the anticaking agent comprises 10 wt. % calcium sulfate. In certain embodiments, the anticaking agent comprises 2 wt. % calcium sulfate. In certain embodiments, the anticaking agent comprises more than 2 wt. % calcium sulfate. In certain embodiments, the anticaking agent comprises more than 5 wt. % calcium sulfate. In certain embodiments, the anticaking agent comprises less than 15 wt. % calcium sulfate.

In certain embodiments, the anticaking agent comprises 1-15 wt. % calcium phosphate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % calcium phosphate. In certain embodiments, the anticaking agent comprises 10 wt. % calcium phosphate. In certain embodiments, the anticaking agent comprises 2 wt. % calcium phosphate. In certain embodiments, the anticaking agent comprises more than 2 wt. % calcium phosphate. In certain embodiments, the anticaking agent comprises more than 5 wt. % calcium phosphate. In certain embodiments, the anticaking agent comprises less than 15 wt. % calcium phosphate. The calcium phosphate may be monocalcium phosphate ($Ca(H_2PO_4)_2$), dicalcium phosphate ($Ca_2(HPO_4)_2$), or tricalcium phosphate ($Ca_3(PO_4)_2$), or combinations thereof.

In certain embodiments, the anticaking agent comprises 1-15 wt. % tricalcium phosphate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % tricalcium phosphate. In certain embodiments, the anticaking agent comprises 10 wt. % tricalcium phosphate. In certain embodiments, the anticaking agent comprises 2 wt. % tricalcium phosphate. In certain embodiments, the anticaking agent comprises more than 2 wt. % tricalcium phosphate. In certain embodiments, the anticaking agent comprises more than 5 wt. % tricalcium phosphate. In certain embodiments, the anticaking agent comprises less than 15 wt. % tricalcium phosphate.

In certain embodiments, the anticaking agent comprises 3-99 wt. % cellulose, such as between 9 between 3 wt. % and 5 wt. %, between 5 wt. % and 10 wt. %, between 10 wt. % and 15 wt. %, between 15 wt. % and 20 wt. %, between 20 wt. % and 25 wt. %, between 30 wt. % and 35 wt. %, between 35 wt. % and 40 wt. %, between 40 wt. % and 45 wt. %, between 45 wt. % and 50 wt. %, between 50 wt. % and 55 wt. %, between 55 wt. % and 60 wt. %, between 60 wt. % and 65 wt. %, between 65 wt. % and 70 wt. %, between 70 wt. % and 75 wt. %, between 75 wt. % and 80 wt. %, between 80 wt. % and 85 wt. %, between 85 wt. % and 90 wt. %, between 90 wt. % and 95 wt. %, about 96 wt. %, about 97 wt. %, about 98 wt. %, or about 99 wt. % cellulose. In certain embodiments, the anticaking agent comprises more than 9.5 wt. % cellulose. In certain embodiments, the anticaking agent comprises less than 40 wt. % cellulose.

"Starch" refers to any material comprising the complex polysaccharide carbohydrates of plants, comprising amylose and amylopectin with the formula $(C_6H_{10}O_5)_x$, wherein x can be any number. In various embodiments, the starches used herein are native starches and/or starches that have been modified by cross-linking, derivatization, substitution, or other processes that involve chemical treatment to impart desired functional properties. In certain embodiments, the modified starches are cross-linked, which may comprise a native starch that has been cross-linked via any suitable cross-linking technique known in the art or otherwise found to be suitable in conjunction with the disclosed compositions. In a specific embodiment, the modified starch is distarch phosphate with and without substitution using any type of native starch or acid or enzyme-modified starches with or without cross-linking and/or substitution.

Suitable starches include vegetable starches (e.g., potato starch, pea starch, tapioca) and grain starches (e.g., corn starch, wheat starch, rice starch). Specific Examples of suitable corn starches include dent corn starch, waxy corn starch, and high amylose corn starch. The starches can be used individually or in combination. In certain embodiments, the starch can be modified or native. Modified food starches differ in their degree of cross-linking, type of chemical substitution, oxidation level, degree of molecular scission, and the ratio of amylose to amylopectin.

Major starch sources include cereals (rice, wheat, and maize) and root vegetables (potatoes and cassava). Other starch sources include, but are not limited to, acorns, arrowroot, arracacha, bananas, barley, breadfruit, buckwheat, canna, *Colocasia*, Katakura, kudzu, malanga, millet, oats, oca, arrowroot, sago, sorghum, sweet potatoes, rye, taro, chestnuts, water chestnuts, yams, and many kinds of beans, such as favas, lentils, mung beans, peas, and chickpeas.

Upon cooking, starch is transformed from an insoluble, difficult-to-digest granule into readily accessible glucose chains with nutritional and functional properties. The amylose/amylopectin ratio, molecular weight, and fine molecular structure influence the physicochemical properties and energy release of different types of starches. In addition, cooking and food processing each impact starch digestibility and energy release. Starch has been classified as rapidly digestible, slowly digestible, and resistant starch, depending upon its digestion profile. Raw starch granules resist digestion by human enzymes and do not break down into glucose in the small intestine—they reach the large intestine instead and function as prebiotic dietary fiber. When starch granules are fully gelatinized and cooked, the starch becomes easily digestible and releases glucose quickly within the small intestine. When starchy foods are cooked and cooled, some glucose chains re-crystallize and become resistant to digestion. Slowly digestible starch can be found in raw cereals, where digestion is slow but relatively complete within the small intestine. Widely used prepared foods containing starch are breads, pancakes, cereals, noodles, pastas, porridges, and tortillas.

For example, starches can be extracted and refined from seeds, roots, and tubers, for example, by wet grinding, washing, sieving, and drying. In certain embodiments, the starch is chosen from corn, tapioca, arrowroot, wheat, rice, and potato starches. In certain embodiments, the starch is chosen from sweet potato, sago, and mung bean.

Untreated starch requires heat to thicken or gelatinize. When a starch is pre-cooked, it can then be used to thicken instantly in cold water. This is referred to as "pregelatinized starch." Starch can be hydrolyzed into simpler carbohydrates by acids, various enzymes, or a combination. The resulting fragments are known as dextrans. The extent of conversion is typically quantified by dextrose equivalent (DE), roughly the fraction of the glycosidic bonds in starch that has been broken. For example, maltodextrin is a lightly hydrolyzed (DE 10-20) starch product used as a bland-tasting filler and thickener.

"Modified starch" is a starch that has been chemically modified to allow the starch to function under conditions frequently encountered during processing or storage, such as high heat, high shear, low pH, freeze/thaw, and cooling. Modified starches are E coded according to European Food Safety Authority and INS-coded Food Additives per the Codex *Alimentarius*:

1400 Dextrin
1401 Acid-treated starch
1402 Alkaline-treated starch
1403 Bleached starch
1404 Oxidized starch
1405 Starches, enzyme-treated
1410 Monostarch phosphate
1412 Distarch phosphate
1413 Phosphated distarch phosphate
1414 Acetylated distarch phosphate
1420 Starch acetate
1422 Acetylated distarch adipate
1440 Hydroxypropyl starch
1442 Hydroxypropyl distarch phosphate
1443 Hydroxypropyl distarch glycerol
1450 Starch sodium octenyl succinate
1451 Acetylated oxidized starch INS 1400, 1401, 1402, 1403, and 1405 are EU food ingredients without an E-number. Typical modified starches include cationic starches, hydroxyethyl starch, and carboxymethylated starches. In certain embodiments, the anticaking agent comprises any starch disclosed herein or combinations of two or more starches disclosed herein.

A "resistant starch" is the sum of starch and products of starch degradation not absorbed in the small intestine of a healthy human being. Resistant starch occurs naturally in foods but may also be added as isolated or manufactured resistant starch.

Resistant Starch has been Categorized into Four Types:
RS1— Physically inaccessible or undigestible resistant starch, such as that found in seeds or legumes and unprocessed whole grains;
RS2— Resistant starch is inaccessible to enzymes due to starch conformation, as in high amylose corn starch;
RS3— Resistant starch formed when starch-containing foods are cooked and cooled, such as pasta. Occurs due to retrogradation, which refers to the collective processes of dissolved starch becoming less soluble after being heated and dissolved in water and then cooled; and RS4— Starches that have been chemically modified to resist digestion.

Some resistant starches (RS1, RS2, and RS3) are fermented by the large intestinal microbiota, conferring benefits to human health by producing short-chain fatty acids, increasing bacterial mass, and producing butyrate-producing bacteria. Starches with high amylose content generally have increased resistant starch.

In certain embodiments, the starch is chosen from corn starch, wheat starch, rice starch, sago starch, tapioca starch, tapioca flour, sorghum starch, potato starch, and combinations thereof.

In certain embodiments, the anticaking agent comprises 48-99 wt. % starch, such as between 48 wt. % and 50 wt. %, between 50 wt. % and 55 wt. %, between 55 wt. % and 60 wt. %, between 60 wt. % and 65 wt. %, between 65 wt. % and 70 wt. %, between 70 wt. % and 75 wt. %, between 75 wt. % and 80 wt. %, between 80 wt. % and 85 wt. %, between 85 wt. % and 90 wt. %, between 90 wt. % and 95 wt. %, about 96 wt. %, about 97 wt. %, about 98 wt. %, or about 99 wt. % starch. In certain embodiments, the anticaking agent comprises 30-51 wt. % starch, such as between 30 wt. % and 35 wt. %, between 35 wt. % and 40 wt. %, between 40 wt. % and 45 wt. %, between 45 wt. % and 50 wt. %, or between 50 wt. % and 51 wt. % starch. In certain embodiments, the anticaking agent comprises more than 30 wt. % starch. In certain embodiments, the anticaking agent comprises less than 51 wt. % starch.

"Sugarcane fiber" or "bagasse" is the fibrous matter that remains after sugarcane is crushed to extract its juice. Typical washed and dried sugarcane fiber comprises 45-55% cellulose, 20-25% hemicellulose, 18-24% lignin, 1-4% ash, and less than 1% waxes. Sugarcane fiber begins as a heterogeneous material containing about 30-40% "pith" fiber, which is derived from the core of the plant and is mainly parenchyma material, and "bast," "rind," or "stem" fiber, which comprises the balance and is largely derived from sclerenchyma material. Sugarcane fiber is a soluble fiber.

In certain embodiments, the extract is the only an antimycotic contained in the anticaking agent. In certain embodiments, the anticaking agent does not comprise natamycin.

In certain embodiments, the anticaking agent comprises 0.01-1.5 wt. % silicon dioxide (silica), such as between 0.01 wt. % and 0.1 wt. %, between 0.1 wt. % and 0.2 wt. %, between 0.2 wt. % and 0.3 wt. %, between 0.3 wt. % and 0.4 wt. %, between 0.4 wt. % and 0.5 wt. %, between wt. % and 0.6 wt. %, between 0.6 wt. % and 0.7 wt. %, between 0.7 wt. % and 0.8 wt. %, between 0.8 wt. % and 0.9 wt. %, between 0.9 wt. % and 1.0 wt. %, between 1.0 wt. % and 1.1 wt. %, between 1.1 wt. % and 1.2 wt. %, between 1.2 wt. % and 1.3 wt. %, between 1.3 wt. % and 1.4 wt. %, or between 1.4 wt. % and 1.5 wt. % silicon dioxide. In certain embodiments, the anticaking agent comprises 0.02 wt. % silicon dioxide. In certain embodiments, the anticaking agent comprises more than 0.1 wt. % silicon dioxide. In certain embodiments, the anticaking agent comprises less than 1.5 wt. % silicon dioxide. The silicon dioxide (silica) may be Sipernat™ by Evonik, such as Sipernat™ 22LS or Sipernat™ 50 S. Sipernat™ 22LS has spherical particles, low fines content and high oil absorption (DBP) supplied by Evonik Industries. Sipernat™ combines high absorption capacity for liquids with high bulk density and good flow properties.

In certain embodiments, the anticaking agent comprises 0.01-5 wt. % mineral oil, such as between 0.01 wt. % and 0.05 wt. %, between 0.05 wt. % and 0.1 wt. %, between 0.1 wt. % and 0.15 wt. %, between 0.15 wt. % and 0.2 wt. %, between 0.2 wt. % and 0.25 wt. %, between 0.25 wt. % and 0.3 wt. %, between 0.3 wt. % and 0.35 wt. %, between 0.35 wt. % and 0.4 wt. %, between 0.4 wt. % and 0.45 wt. %, between 0.45 wt. % and 0.5 wt. %, between 0.5 wt. % and 0.75 wt. %, between 0.75 wt. % and 1.0 wt. %, between 1.0 wt. % and 1.25 wt. %, between 1.25 wt. % and 1.5 wt. %, between 1.5 wt. % and 1.75 wt. %, between 1.75 wt. % and 2.0 wt. %, between 2.0 wt. % and 2.25 wt. %, between 2.25 wt. % and 2.5 wt. %, between 2.5 wt. % and 2.75 wt. %, between 2.75 wt. % and 3.0 wt. %, between 3.0 wt. % and 3.25 wt. %, between 3.25 wt. % and 3.5 wt. %, between 3.5 wt. % and 3.75 wt. %, between 3.75 wt. % and 4.0 wt. %, between 4.0 wt. % and 4.25 wt. %, between 4.25 wt. % and 4.5 wt. %, between 4.5 wt. % and 4.75 wt. %, or between 4.75 wt. % and wt. % mineral oil. In certain embodiments, the anticaking agent comprises 0.04-0.5 wt. % mineral oil, such as 0.04 wt. %, between 0.05 wt. % and 0.1 wt. %, between 0.1 wt. % and 0.15 wt. %, between 0.15 wt. % and 0.2 wt. %, between 0.2 wt. % and 0.25 wt. %, between 0.25 wt. % and 0.3 wt. %, between 0.3 wt. % and 0.35 wt. %, between 0.35 wt. % and 0.4 wt. %, between 0.4 wt. % and 0.45 wt. %, or between 0.45 wt. % and 0.5 wt. % mineral oil. In certain embodiments, the anticaking agent comprises more than 0.01 wt. % mineral oil. In certain embodiments, the anticaking agent comprises more than 0.05 wt. % mineral oil. In certain embodiments, the anticaking agent comprises less than 5 wt. % mineral oil. In certain embodiments, the anticaking agent comprises less than 0.5 wt. % mineral oil.

In certain embodiments, the anticaking agent comprises 1.0-5.0 wt. % high-oleic sunflower oil (HOSFO), such as between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, or between 1.0 wt. % and 1.5 wt. % high oleic sunflower oil. In certain embodiments, the anticaking agent comprises 4.6 wt. % high-oleic sunflower oil. In certain embodiments, the anticaking agent comprises more than 1.0 wt. % high-oleic sunflower oil. In certain embodiments, the anticaking agent comprises less than 5.0 wt. % high-oleic sunflower oil.

In certain embodiments, the anticaking agent is essentially free of clays, such as bentonite. In certain embodiments, the anticaking agent is essentially free of metal carbonates, such as calcium carbonate. In certain embodiments, the anticaking agent is essentially free of silicon dioxide. In certain embodiments, the anticaking agent is essentially free of cellulose. In certain embodiments, the anticaking agent is essentially free of cellulose and metal carbonates.

In certain embodiments, the anticaking agent comprises 21-66 wt. % potato starch; 0.5-10 wt. % botanical extract, 0-1 wt. % mineral oil; 0-1 wt. % silica; 15-30 wt. % reducing sugar; 0.2-0.8 wt. % glucose oxidase; and 0-2 wt. % salt chosen from sodium chloride, calcium chloride, and magnesium chloride.

In certain embodiments, the anticaking agent comprises 46-70 wt. % one or more dairy ingredients chosen from milk permeate powder, whey permeate powder, dried whey, and combinations thereof; 30-64 wt. % one or more non-dairy ingredients chosen from cellulose, sugarcane fiber, calcium sulfate, calcium phosphate, dicalcium phosphate, silicon dioxide, starch, dextrose monohydrate, glucose oxidase, potassium sorbate, mineral oil, high oleic sunflower oil, and combinations thereof. In certain embodiments, the dairy ingredient is milk permeate powder. In certain embodiments, the dairy ingredient is whey permeate powder. In certain embodiments, the dairy ingredient is dried whey comprising 60-65 wt. % of the anticaking agent, and 0.5-10 wt. % botanical extract.

In certain embodiments, the anticaking agent comprises 2-15 wt. % calcium sulfate.

In certain embodiments, the anticaking agent comprises 9.5-40 wt. % cellulose.

In certain embodiments, the anticaking agent comprises starch. In certain embodiments, the starch is chosen from potato starch, corn starch, tapioca starch, and combinations thereof.

In certain embodiments, the anticaking agent comprises 25-30.2 wt. % sugarcane fiber.

In certain embodiments, the anticaking agent comprises 9.7-20 wt. % dextrose and 0.04-0.05 wt. % glucose oxidase.

In certain embodiments, the anticaking agent comprises tapioca starch and sorbic acid.

In certain embodiments, the anticaking agent comprises 15-30 wt. % reducing sugar; 0.2-0.8 wt. % glucose oxidase; 0-2 wt. % salt chosen from sodium chloride, calcium chloride, and magnesium chloride; and 1-10 wt. % sorbic acid.

In certain embodiments, the anticaking agent comprises 46-70 wt. % one or more dairy ingredients chosen from milk permeate powder, whey permeate powder, dried whey, and combinations thereof; 30-64 wt. % one or more non-dairy ingredients chosen from cellulose, sugarcane fiber, calcium sulfate, calcium phosphate, dicalcium phosphate, silicon dioxide, starch, dextrose monohydrate, glucose oxidase, potassium sorbate, mineral oil, high oleic sunflower oil, and combinations thereof; and 1-10 wt. % sorbic acid.

In certain embodiments, the anticaking agent, when applied at a loading of between 3 wt. % and 5 wt. % relative to divided cheddar cheese, has little to no visibility on the divided cheddar cheese. In certain embodiments, the anticaking agent, when applied at a loading of between 3 wt. % and 5 wt. % relative to divided cheddar cheese, prevents caking of the divided cheddar cheese. In certain embodiments, the anticaking agent, when applied at a loading of between 3 wt. % and 5 wt. % relative to divided cheddar cheese, browns similarly to the divided cheddar cheese without the anticaking agent when baked in an impinger oven at between 425° F. and 450° F. for 5 minutes.

Food Product

The present disclosure also provides a food product comprising: divided cheese comprising a plurality of individual cheese particles; and an anticaking agent disclosed herein dispersed on the individual cheese particles in an amount sufficient to inhibit caking of the individual cheese particles. In certain embodiments, the anticaking agent is applied at up to 10 wt. % of the product.

In various embodiments, the anticaking agent is applied to divided cheese at between 0.1 wt. % and 10 wt. %. In various embodiments, the anticaking agent is applied to divided cheese at about 1 wt. %. In various embodiments, the anticaking agent is applied to divided cheese at about 2 wt. %. In various embodiments, the anticaking agent is applied to divided cheese at about 3 wt. %. In various embodiments, the anticaking agent is applied to divided cheese at about 4 wt. %. In various embodiments, the anticaking agent is applied to divided cheese at about 5 wt. %. In various embodiments, the anticaking agent is applied to divided cheese at about 6 wt. %. In various embodiments, the anticaking agent is applied to divided cheese at about 7 wt. %. In various embodiments, the anticaking agent is applied to divided cheese at about 8 wt. %. In various embodiments, the anticaking agent is applied to divided cheese at about 9 wt. %. In various embodiments, the anticaking agent is applied to divided cheese at about 10 wt. %.

The present disclosure provides an anticaking agent for cheese, comprising a botanical extract from *Sorbus*.

In certain embodiments, *Sorbus* is chosen from *Sorbus aucuparia*, *Sorbus americana*, *Sorbus aria*, *Sorbus alnifolia*, *Sorbus domestica*, *Sorbus torminalis*, and *Sorbus chamaemespilus*. In certain embodiments, *Sorbus* is *Sorbus aucuparia*.

In certain embodiments, the anticaking agent comprises 49-99 wt. % starch, 0-1 wt. % mineral oil, 0-1 wt. % silica, and 0.5-20 wt. % of the botanical extract.

In certain embodiments, the starch is chosen from potato starch, corn starch, tapioca starch, and combinations thereof.

In certain embodiments, the anticaking agent comprises 21-70 wt. % potato starch, tapioca starch or a combination thereof; 0.5-10 wt. % of the botanical extract; 0-1 wt. % mineral oil; 0-1 wt. % silica; 15-30 wt. % reducing sugar; 0.2-0.8 wt. % glucose oxidase; and 0-2 wt. % salt chosen from sodium chloride, calcium chloride, and magnesium chloride.

In certain embodiments, the anticaking agent comprises 46-70 wt. % one or more dairy ingredients chosen from milk permeate powder, whey permeate powder, dried whey, and combinations thereof; 30-64 wt. % one or more non-dairy ingredients chosen from cellulose, sugarcane fiber, calcium sulfate, calcium phosphate, dicalcium phosphate, silicon dioxide, starch, dextrose monohydrate, glucose oxidase, potassium sorbate, mineral oil, high oleic sunflower oil, and combinations thereof; and 0.5-10 wt. % of the botanical extract.

In certain embodiments, the one or more dairy ingredients is milk permeate powder or whey permeate powder.

In certain embodiments, the one or more dairy ingredients is dried whey, comprising 60-wt. % of the anticaking agent.

In certain embodiments, the anticaking agent comprises 2-15 wt. % calcium sulfate.

In certain embodiments, the anticaking agent comprises 9-40 wt. % cellulose.

In certain embodiments, the anticaking agent comprises starch.

In certain embodiments, the starch is chosen from corn starch, potato starch, tapioca starch, and combinations thereof.

In certain embodiments, the anticaking agent comprises 25-35 wt. % sugarcane fiber.

In certain embodiments, the anticaking agent comprises 5-20 wt. % dextrose and 0.04-0.05 wt. % glucose oxidase.

In certain embodiments, the anticaking agent, when applied at a loading of between 3 wt. % and 5 wt. % relative to divided cheddar cheese, has little to no visibility on the divided cheddar cheese, prevents caking of the divided cheddar cheese, and browns similarly to the divided cheddar cheese without the anticaking agent when baked in an impinger oven at between 425° F. and 450° F. for 5 minutes.

The present disclosure also provides a food product comprising a divided cheese comprising a plurality of individual cheese particles; and an anticaking agent described herein dispersed on the plurality of individual cheese particles in an amount sufficient to inhibit caking of the plurality of individual cheese particles.

The present disclosure further provides a method of treating divided cheese for anticaking, comprising dispersing a anticaking agent described herein over a divided cheese.

In certain embodiments, the anticaking agent is applied at between about 1 wt. % and about 6 wt. % of the divided cheese.

In certain embodiments, the anticaking agent is applied at about 4 wt. % of the divided cheese.

When introducing elements of the present disclosure or in an embodiment, the articles "a," "an," "the," and "said" are intended to mean that there are one or more of the elements. "Comprising," "including," and "having" are inclusive and mean that there may be additional elements other than the listed elements.

"And/or" when in a list of two or more items means that any listed items can be employed by itself or in combination with one or more of the listed items. For example, "A and/or B" means either or both of A and B, i.e., A alone, B alone, or A and B in combination. Likewise, the expression "A, B and/or C" means A alone, B alone, C alone, A and B in combination, A and C in combination, B and C in combination, or A, B, and C in combination.

The term "about" qualifies the numerical values it modifies, denoting such a value as a variable within a margin of error. When no margin of error, such as a standard deviation to a mean value given in a chart or table of data, is recited, the term "about" means that range that would encompass the recited value and the range which would be included by rounding up or down to that figure, considering significant figures.

EXAMPLES

Example 1—Anticaking Compositions

Potato-starch-based (PSB) anticaking agents (Examples 1-5, Table 1), corn-starch-based (CSB) anticaking agents (Examples 6-10, Table 2), oxygen-scavenging-system-containing (OSS) anticaking agents (Example 11-15, Table 3), and dairy-ingredient-based (FAD) anticaking agents (Examples 16-20, Table 4) were made and tested with controls containing 100 ppm (200 ppm of Delvo®Cid) and 400 ppm (800 ppm of Delvo®Cid) natamycin and botanical extract (1.25 wt. %, 2.5 wt. %, and 10 wt. %). Evonik IM-Glenn Corp provided the hydrated silica as Sipernat® 50 (hydrated silica). The natamycin was provided as Delvo®Cid from DSM (natamycin content: 50 wt. %) and used as a negative control. In the Examples, the botanical extract is derived from *Sorbus aucuparia*.

TABLE 1

Potato starch-based (PSB) anticaking agents

| Ingredient | Example (wt. %) | | | | |
| --- | --- | --- | --- | --- | --- |
| | 1 (Control) | 2 (Control) | 3 | 4 | 5 |
| Potato starch | 99.88% | 99.94% | 93.71% | 87.46% | 49.96% |
| Tapioca Starch | — | — | 5.00% | 10.00% | 40.00% |
| Botanical extract | — | — | 1.25% | 2.50% | 10.00% |
| Delvo ®Cid (50% natamycin) | 0.08% | 0.02% | — | — | — |
| Mineral Oil | 0.03% | 0.03% | 0.03% | 0.03% | 0.03% |
| Silica | 0.02% | 0.02% | 0.02% | 0.02% | 0.02% |

TABLE 2

Corn-starch-based (CSB) anticaking agents

| Ingredient | Example (wt. %) | | | | |
| --- | --- | --- | --- | --- | --- |
| | 6 (Control) | 7 (Control) | 8 | 9 | 10 |
| Corn starch | 99.84% | 99.90% | 93.67% | 87.42% | 49.92% |
| Tapioca starch | — | — | 5.00% | 10.00% | 40.00% |
| Botanical extract | — | — | 1.25% | 2.50% | 10.00% |
| Delvo ®Cid (50% natamycin) | 0.08% | 0.02% | — | — | — |
| Mineral oil | 0.06% | 0.06% | 0.06% | 0.06% | 0.06% |
| Silica | 0.03% | 0.03% | 0.03% | 0.03% | 0.03% |

TABLE 3

Oxygen-scavenging-system-containing (OSS) anticaking agents

| Ingredient | Example (wt. %) | | | | |
| --- | --- | --- | --- | --- | --- |
| | 11 (Control) | 12 (Control) | 13 | 14 | 15 |
| Potato starch | 71.59% | 71.65% | 65.42% | 59.17% | 21.67% |
| Tapioca starch | — | — | 5.00% | 10.00% | 40.00% |
| Botanical extract | — | — | 1.25% | 2.50% | 10.00% |
| Salt | 1.00% | 1.00% | 1.00% | 1.00% | 1.00% |
| Dextrose | 25.00% | 25.00% | 25.00% | 25.00% | 25.00% |
| Calcium sulfate | 1.99% | 1.99% | 1.99% | 1.99% | 1.99% |
| Delvo ®Cid (50% natamycin) | 0.08% | 0.02% | — | — | — |
| Glucose oxidase | 0.30% | 0.30% | 0.30% | 0.30% | 0.30% |
| Mineral oil | 0.025% | 0.025% | 0.025% | 0.025% | 0.025% |
| Silica | 0.015% | 0.015% | 0.015% | 0.015% | 0.015% |

TABLE 4

Dairy-ingredient-based anticaking agents (FloAm ® Dairy, FAD)

| Ingredient | Example (wt. %) | | | | |
| --- | --- | --- | --- | --- | --- |
| | 16 (Control) | 17 (Control) | 18 | 19 | 20 |
| Whey permeate (DPS) | 69.64% | 69.70% | 63.47% | 57.22% | 19.72% |
| Sugarcane fiber | 30.08% | 30.08% | 30.08% | 30.08% | 30.08% |
| Tapioca starch | — | — | 5.00% | 10.00% | 40.00% |
| Botanical extract | — | — | 1.25% | 2.50% | 10.00% |
| Delvo ® Cid (50% natamycin) | 0.08% | 0.02% | — | — | — |
| Mineral oil | 0.20% | 0.20% | 0.20% | 0.20% | 0.20% |

Example 2—Physical Property of Botanical-Extract-Containing (BE) Anticaking Agents This study compared the physical properties of botanical-extract-containing (BE) anticaking agents with that of natamycin (100 and 400 ppm) controls. The flow properties are presented in the flow diagrams of FIGS. 1-4. The dusting level, color, bulk density, water activity, and moisture content of the anticaking agents were measured, and the data is presented in Tables 5-8. The color was described as Hunter scale L*a*b, wherein "L" indicates lightness, "a" is a red-green scale, and "b" is a yellow-blue scale. Shred separation was rated on a 5-point subjective scale.

TABLE 5

Physical properties of PSB anticaking agents

| Property | Example (wt. %) | | | | |
|---|---|---|---|---|---|
| | 1 (Control) | 2 (Control) | 3 | 4 | 5 |
| Moisture (%) | 16.46 | 16.04 | 15.94 | 15.3 | 11.84 |
| Water activity at 25° C. | 0.539 | 0.537 | 0.549 | 0.511 | 0.549 |
| Color* | 97.13* | 96.81* | 94.71* | 92.93* | 90.56* |
| | −0.21* | −0.26* | 0.45* | 0.63* | 1.62* |
| | 1.83 | 1.87 | 4.21 | 5.22 | 8.27 |
| Dusting level | 3.5 | 3.5 | 3.5 | 4 | 4.25 |
| No. of tapping | 2 | 2 | 2 | 4 | 4 |
| Powder flow slope (k)/ intercept (b) | 0.19/ 0.268 | 0.20/ 0.260 | 0.20/ 0.276 | 0.22/ 0.298 | 0.25/ 0.219 |
| Crit. Rat-holing (dia., mm) | 311 | 346 | 555 | 600 | 731 |
| Bulk/tapped density (g/mL) | 0.8158/ 0.8670 | 0.7997/ 0.8790 | 0.7529/ 0.8562 | 0.732/ 0.8499 | 0.6146/ 0.7704 |

TABLE 6

Physical properties of CSB anticaking agents

| Property | Example (wt. %) | | | | |
|---|---|---|---|---|---|
| | 6 (Control) | 7 (Control) | 8 | 9 | 10 |
| Moisture | 10.5% | 10.44% | 10.10% | 10.06% | 8.94% |
| Water activity at 25° C. | 0.35 | 0.351 | 0.366 | 0.379 | 0.416 |
| Color | 96.98* | 97.91* | 96.8* | 95.86* | 92.53* |
| | −0.61*4.71 | −0.58*5.02 | −0.1*4.65 | 0.1*4.76 | 1.13*6.87 |
| Dusting level | 2 | 2 | 4 | 4 | 4.5 |
| No. of taps | 15 | 16 | 20 | 20 | 6 |
| Powder flow slope (k)/ intercept (b) | 0.23/ 0.382 | 0.23/ 0.406 | 0.24/ 0.430 | 0.21/ 0.419 | 0.21/ 0.496 |
| Crit. Rat-holing (dia., mm) | 1248 | 1218 | 1317 | 1197 | 1153 |
| Bulk/tapped density (g/mL) | 0.5079/ 0.7767 | 0.5193/ 0.8092 | 0.5393/ 0.7762 | 0.5004/ 0.7409 | 0.5029/ 0.8110 |

TABLE 7

Physical properties of OSS anticaking agents

| Property | Example (wt. %) | | | | |
|---|---|---|---|---|---|
| | 11 (Control) | 12 (Control) | 13 | 14 | 15 |
| Moisture, % | 14.98% | 14.9% | 14.44% | 11.23% | 10.23% |
| Water activity At 25° C. | 0.569 | 0.575 | 0.594 | 0.590 | 0.590 |
| Color | 96.76* | 96.69* | 94.75* | 93.59* | 88.78* |
| | 0.02*2.68 | 0.04*2.68 | 0.53*4.97 | 0.71*6.32 | 1.96*9.92 |
| Dusting level | 3 | 3 | 3 | 3.5 | 4.25 |
| No. of taps | 0 | 0 | 0 | 4 | 4 |
| Powder flow slope (k)/ intercept (b) | 0.07/ 0.140 | 0.07/ 0.157 | 0.10/ 0.154 | 0.27/ 0.186 | 0.48/ 0.363 |
| Crit. Rat-holing (dia., mm) | 167 | 166 | 261 | 663 | 1513 |
| Bulk/tapped density, g/mL | 0.7884/ 0.9475 | 0.7927/ 0.9657 | 0.7333/ 0.9019 | 0.6142/ 0.8543 | 0.4258/ 0.7529 |

TABLE 8

Physical properties of FAD anticaking agents

| Property | Example (wt. %) | | | | |
|---|---|---|---|---|---|
| | 16 (Control) | 17 (Control) | 18 | 19 | 20 |
| Moisture, % | 4.9% | 4.44% | 5.18% | 5.52% | 6.24% |
| Water activity at 25° C. | 0.322 | 0.325 | 0.344 | 0.355 | 0.437 |
| Color | 92.86* | 92.81* | 92.57* | 92.11* | 91.14* |
| | 0.39* | 0.36* | 0.52* | 0.66* | 1.10* |
| | 10.05 | 10.04 | 9.79 | 9.05 | 8.12 |
| Dusting level | 4 | 4.5 | 4.5 | 4.5 | 5 |
| No. of taps | 0 | 0 | 0 | 0 | 0 |
| Powder flow slope (k)/ intercept (b) | 0.04/ 0.293 | 0.03/ 0.388 | 0.07/ 0.319 | 0.08/ 0.353 | 0.16/ 0.266 |
| Crit. Rat-holing (dia., mm) | 299 | 308 | 442 | 541 | 764 |
| Bulk/tapped density, g/mL | 0.5619/ 0.6878 | 0.5314/ 0.6908 | 0.5006/ 0.6622 | 0.4850/ 0.6620 | 0.4926/ 0.6649 |

To examine the impact of the botanical extract on the physical properties of anticaking agents, the flow properties, dusting, color, and density were measured and compared with the control formula. Noticeably, the dusting levels were improved for all BE-containing anticaking agents. The anticaking agents formulated with a higher amount of the botanical extract created less dust.

FIGS. 1-4 show the powder flow function curve/graph of PSB, CSB, OSS, and FAD anticaking agents containing the botanical extract. The powder flow function graph depicts the relationship between unconfined failure strength (kPa) with major principal consolidating stress (kPa) for Examples 1-20. From bottom to top, the reference lines represent free-flowing, easy flowing, cohesive, and very cohesive. The results showed that incorporating botanical extract impeded the flow of the OSS and FAD anticaking agents. In contrast, its impact on the flow property of CSB and PSB anticaking agents was negligible. Among the OSS anticaking agents, the BE-containing samples (Examples 13-15) showed a much higher flow slope value, k=0.1 for 1.25% botanical extract (free flowing), k=0.27 for 2.5% botanical extract (easy flowing), and k=0.48 for 10% botanical extract content (cohesive), compared to the control formula (k=0.07, free-flowing) (Examples 11 and 12). The FAD anticaking agents showed the same trend.

In contrast, the influence of botanical extract on the CSB and PSB anticaking agents was insignificant, where all flow curves were centered around easy-flowing reference lines. The tapioca starch in these formulations behaved similarly to potato starch. As such, the results above demonstrated that the BE-containing anticaking agents resembled the flow function of PSB and CSB anticaking agents and effectively controlled the dusting level of anticaking agents.

For all types of anticaking agents, the bulk/tapped density of the BE-containing anticaking agents was generally lower than the control. Density decreased with the increasing concentration of botanical extract. For example, within the group of PSB anticaking agents (Examples 1-5), the bulk/tapped density of 1.25% botanical extract was 0.75/0.86 g/mL (Example 3), which was lower than that of controls (0.82/0.87 g/mL for Example 1 and 0.80/0.88 g/mL for Example 2). As the botanical extract content increased to 2.5% and 10%, the bulk/tapped density further decreased to 0.73/0.85 and 0.61/0.77 g/mL, respectively. Similar trends were observed with CSB, OSS, and FAD anticaking agents.

The color of the anticaking agent was measured by spectrophotometer (model CM-5, Konica Minolta, Osaka, Japan) using the Hunter system (L, a, b). Hunter Scale 'L' measures lightness and varies from 100 for perfect white to 0 for black; 'a' measures redness (+), gray (0), and greenness (−); 'ID' measures yellowness (+), gray (0), and blueness (−). The results indicated that incorporating the botanical extract lowered lightness and increased redness and yellowness values compared with the control. Such difference was attributed to the yellow-brownish color of the botanical extract. Specifically, among PSB anticaking agents, the lightness (L) value of potato starch-based anticaking agent with 1.25% botanical extract (Example 3) 94.71 was lower than the control (Example 1: L=97.13, and Example 2: L=96.81), and the redness and yellowness values (a=0.45, b=4.21) were slightly higher than the control (Example 1: a=0.21, b=1.83, Example 2: a=0.26, b=1.87). As the amount of the botanical extract was increased, L value for Examples 4 and 5 was further decreased along with the increasing value of a and b. CSB and OSS anticaking agents exhibited similar color profiles. Due to the yellow-brownish color of dairy product solids, the control for the FAD anticaking agents generally provided a high b value (>10.00). Incorporating the botanical extract reduced the yellowness (b<10.00) slightly. The visual inspection showed that the color difference was acceptable, especially when applied to the cheese at a rate of 1-4%.

In summary, incorporating the botanical extract did not adversely impact the physical properties of anticaking agent products. In addition, the botanical extract does not negatively impact the mixing, flow, and dusting of anticaking agent powders during manufacturing process.

Example 3—Anticaking Properties and Baking Properties of BE-Containing Anticaking Agent The anticaking properties of the BE-containing anticaking agents were examined in this study. Natamycin-containing (100 or 400 ppm) anticaking agents were used as controls. Shredded cheddar and mozzarella cheese samples were treated with the anticaking agents from Examples 1-20, stored at 40° F., and monitored for color, separation/visibility, appearance, browning, and water activity.

The properties of the anticaking compositions were studied via a series of iterative pizza cheese bake tests. Each bake test contained controls, natamycin (100 ppm and 400 ppm) anticaking agents added to shredded cheese at 4.0 wt. %, and experimental groups of botanical extract (1.25, 2.5, and 10%) containing anticaking agents at 4.0 wt. %. Visual examination of anticaking effectiveness was determined 24 hours after the shredded cheese and anticaking agents being mixed. Anticaking agents that resulted in sticking or lumping of cheese shreds were excluded from the bake tests.

Cheese was prepared with the anticaking compositions as follows:
1. Shredded cheese using the use RobotCoupe™ R2 with grater #3 for cheddar (average shred diameter of 3 mm) and grater #6 for mozzarella (average shred diameter of 6 mm).
2. Weighed desired quantity of cheese.
3. Placed cheese into a 60-ounce plastic container and added anticaking agent at 4 wt. %.
4. Sealed the bag and shook it by hand for 2 min until the anticaking agent was fully incorporated into the shredded cheese.
5. Hold the shredded cheese with anticaking agent ingredients in the 60-ounce plastic bag at ° F. for 72 hours.
6. For the pizza cheese bake evaluation, the Pizza Preparation and Evaluation procedure was followed.
7. Pizza was prepared and evaluated using the following methods:
   1. Preheated Impinger Oven to 450° F. Set the bake time for 5 minutes.
   2. Removed up to 4 sets of shredded cheese with an anticaking agent ingredient from a cooler and four pizza crusts from a freezer and placed on a counter at room temperature.
   3. Placed 120 g of pizza sauce on a 12 "pizza crust and spread uniformly to about 1" of the edge. Uniformly distributed 180 grams of anticaking agent coated cheese onto the pizza.
   4. Placed the pizza on a round pizza screen. Then, placed the screen on the conveyor belt and baked the pizza. Do not push the pizza into the oven; allowed the belt to pull the pizza into the Impinger Oven.
   5. While cooling, evaluated pizza for browning, oiling off, and shred using the Pizza Cheese Evaluation Guidelines (Table 11).
   7. Evaluated flavor, mouth feel, and appearance at 10 minutes.
   8. Evaluated pizza cheese appearance after 30 minutes and 60 minutes. Recorded any observations.

The cheese evaluation guidelines are summarized in Table 9. The results are presented in Tables 10-14. The appearance was described using the Hunter scale. Shred separation was rated on a 5-point subjective scale.

TABLE 9

Cheese Evaluation Guidelines
Pizza Cheese Evaluation Guidelines

| | |
|---|---|
| 1 | Browning |
| 5 | No or very few small brown spots |
| 4 | Small brown spots about the size of a dime (1.8 cm diameter) |
| 2 | 50% brown spots on the surface-some large, some small |
| 1 | 95-100% covered with large (quarter-sized, 2.4 cm diameter) brown spots on the surface |
| 2 | Oiling |
| 5 | Slight oil sheen visible |
| 4 | Very few pools present, smaller than a dime (1.8 cm) |
| 2 | Slight pools present, larger than a dime (1.8 cm) |
| 1 | Many large pools present |
| 3 | Shred |
| 5 | Confluent-melting all together |
| 4 | Outline of shred still evident-10% |
| 2 | Outline of shreds still evident-30% |
| 1 | Little to no sign of melting String-2 minutes until breakage Noted as the actual length of the string when lifted with a fork. |
| 4 | Flavor |
| 5 | Good flavor-no off-tastes |
| 2.5 | Some off notes on flavor |
| 1 | Unacceptable flavor |
| 5 | Mouthfeel |
| 5 | Smooth, tender body |
| 4 | Mostly soft or slightly chewy, but smooth |
| 2 | Moderately tough or chewy, mealy, grainy plastic mouthfeel |
| 1 | Extremely tough, excessive graininess, sandiness, and/or chewiness |
| 6 | Appearance at 10 minutes |
| 5 | White or slight off-white |
| 4 | Slightly translucent |
| 2 | Moderately translucent |
| 1 | Very translucent |

TABLE 10

Physical properties of shredded cheese coated with PSB anticaking agents

| Property | 1 (Control) | 2 (Control) | 3 | 4 | 5 |
|---|---|---|---|---|---|
| Mozz. shred separation | 5/slightly white color | 5/slightly white color | 5/slightly white color | 5/slightly white color | 4/slightly white color |
| Mozz. shred appearance | 80.74* 0.41*20.15 | 81* 0.59*21.56 | 78.67* 0.33*18.69 | 78.23* 0.16*19.03 | 77.61* 0.76*19.76 |
| Mozz. shred water activity | 0.976 at 23.88° C. | 0.975 at 24.24° C. | 0.974 at 24.15° C. | 0.977 at 24.25° C. | 0.978 at 24.35° C. |
| Cheddar shred separation/visibility | 5/slightly white color | 5/slightly white color | 5/slightly white color | 4.5/slightly white color | 3/slightly white color |
| Cheddar shred appearance | 68.85* 19.32*33.71 | 68.05* 18.24*31.41 | 66.75* 18.75*32.63 | 67.02* 17.25*30.6 | 67.9* 18.57*31.27 |
| Cheddar shred water activity | 0.9502 at 23.94° C. | 0.956 at 24.65° C. | 0.9497 at 24.23° C. | 0.9504 at 24.08° C. | 0.9535 at 23.97° C. |

TABLE 12

Physical properties of shredded cheese coated with CSB anticaking agents

| | Example (wt. %) | | | | |
|---|---|---|---|---|---|
| Property | 6 (Control) | 7 (Control) | 8 | 9 | 10 |
| Mozz. shred separation | 4.5 | 4.5 | 4 | 4 | 3.75 |
| Mozz. shred appearance (L*a*b) | 82.63* −0.26*17.97 | 82.50* −0.36*18.12 | 82.32* −0.5*17.48 | 82.96* 0.07*16.57 | 81.96* 0.87*19.02 |
| Mozz. shred water activity | 0.968 at 23.04° C. | 0.968 at 21.97° C. | 0.969 at 22.10° C. | 0.974 at 22.00° C. | 0.971 at 23.35° C. |
| Cheddar shred separation/visibility[1] | 4 | 4 | 4 | 4.5 | 3.5 |
| Cheddar shred appearance (L*a*b) | 68* 17.61*32.11 | 69.10* 19.77*34.18 | 68.6* 18.66*34.3 | 68.06* 17.33*32.59 | 66.07* 16.9*30.88 |
| Cheddar shred water activity | 0.956 at 23.99° C. | 0.960 at 23.90° C. | 0.954 at 23.42° C. | 0.968 at 22.07° C. | 0.954 at 23.41° C. |

TABLE 12

Physical properties of shredded cheese coated with OSS anticaking agents

| | Example (wt. %) | | | | |
|---|---|---|---|---|---|
| Property | 11 (Control) | 12 (Control) | 13 | 14 | 15 |
| Mozz. shred separation | 4.75 | 4.75 | 4.5 | 4.5 | 4.25 |
| Mozz. shred appearance (L*a*b) | 82.18* −0.47*18.03 | 85.02* −0.29*17.84 | 82.87* −0.41*18.12 | 84.05* 0.16*19.86 | 81.9* 0.36*19.13 |
| Mozz. shred water activity | 0.970 at 23.01° C. | 0.971 at 24.5° C. | 0.969 at 24.6° C. | 0.968 at 24.12° C. | 0.964 at 24.25° C. |
| Cheddar shred separation/visibility | 4.5 | 4.5 | 4.5 | 4.5 | 4 |
| Cheddar shred appearance (L*a*b) | 70.94* 20.83*38.11 | 70.13* 20.04*36.81 | 68.79* 20.03*35.19 | 69.99* 21.12*38.84 | 65.03* 17.58*33.13 |
| Cheddar shred water activity | 0.943 at 23.25° C. | 0.947 at 22.05° C. | 0.941 at 23.89° C. | 0.933 at 24.25° C. | 0.931 at 24.07° C. |

TABLE 13

Physical properties of shredded cheese coated with FAD anticaking agents

| Property | Example (wt. %) | | | | |
|---|---|---|---|---|---|
| | 16 (Control) | 17 (Control) | 18 | 19 | 20 |
| Mozz. shred separation | 4.5 | 4.5 | 4.5 | 4.5 | 4 |
| Mozz. shred appearance (L*a*b) | 79.97* −0.39*16.75 | 78.58* −0.44*16.37 | 81.50* 0.02*17.12 | 79.44* 0.27*18.36 | 80.58* 0.67*18.58 |
| Mozz. shred water activity | 0.972 at 21.89° C. | 0.974 at 24.34° C. | 0.959 at 24.45 ° C. | 0.964 at 24.70° C. | 0.961 at 23.06° C. |
| Cheddar shred separation/visibility | 4.75 | 4.75 | 4 | 4 | 3.5 |
| Cheddar shred appearance (L*a*b) | 68.46* 18.90*32.63 | 70.05* 20.14*34.41 | 67.70* 19.30*31.64 | 70.09* 19.45*32.48 | 69.39* 19.17*33.51 |
| Cheddar shred water activity | 0.960 at 22.76° C. | 0.960 at 21.95° C. | 0.939 at 23.51° C. | 0.951 at 22.03° C. | 0.951 at 24.03° C. |

TABLE 14

Pizza test of single samples baked at 450° F. for 5 min

| Sample | 1 | 2 | 3 | 4 | 5 | 6 | 7 | 8 | 9 | 10 |
|---|---|---|---|---|---|---|---|---|---|---|
| Browning | 4.00 | 4.00 | 4.50 | 4.50 | 4.00 | 3.00 | 3.00 | 3.00 | 3.00 | 3.25 |
| Shreds | 3.00 | 3.50 | 4.00 | 3.75 | 4.00 | 4.50 | 4.50 | 4.50 | 4.50 | 4.50 |
| Flavor | 9.00 | 9.00 | 9.00 | 8.50 | 8.00 | 3.00 | 3.00 | 3.00 | 3.00 | 3.00 |
| Mouthfeel | 9.00 | 9.00 | 9.25 | 9.00 | 9.00 | 3.50 | 3.50 | 3.50 | 3.50 | 3.00 |
| Appearance (10 min) | 4.00 | 4.00 | 4.50 | 4.50 | 4.00 | 3.25 | 3.25 | 3.25 | 3.50 | 3.50 |
| Sample | 11 | 12 | 13 | 14 | 15 | 16 | 17 | 18 | 19 | 20 |
| Browning | 3.50 | 3.50 | 4.00 | 4.25 | 4.25 | 3.50 | 3.50 | 3.50 | 3.00 | 2.50 |
| Shreds | 4.50 | 4.50 | 4.50 | 4.50 | 4.50 | 3.00 | 3.00 | 3.00 | 3.00 | 3.25 |
| Flavor | 4.25 | 4.25 | 4.25 | 4.25 | 4.25 | 4.50 | 4.50 | 4.50 | 4.00 | 3.75 |
| Mouthfeel | 4.00 | 4.00 | 4.25 | 4.25 | 4.25 | 4.50 | 4.50 | 4.00 | 4.00 | 3.75 |
| Appearance (10 min) | 3.50 | 3.50 | 4.00 | 4.25 | 4.25 | 3.50 | 3.50 | 3.50 | 3.00 | 2.50 |

To characterize the anticaking and coating efficacy of anticaking agents formulated with botanical extract, the shred separation, cheese color (appearance), and water activity were measured. Generally, the shred separation of low-content botanical extract (1.25%) anticaking agents was comparable to the controls. The increasing concentration of botanical extract reduced the rating of shred separation. For example, the shred separation of cheddar cheese coated with control (Example 1) and 1.25% botanical extract (Example 3) were both rated as 5 points. Samples containing 2.5% (Example 4) and 10% botanical extract (Example 5) had lower shred separation rating, at 4.5 and 3 points, respectively.

According to the Hunter scale, botanical extract anticaking agents coated cheese was generally slightly darker than the controls. The color difference was more detectable in mozzarella cheese on a measurable scale. Specifically, the lightness (L) values of Example 3 (78.67), 4 (78.23), and 5 (77.61) coated mozzarella cheese were lower than those of control anticaking agent Example 1 (80.74) and 2 (81.00).

The color difference was less noticeable among cheddar cheese, which starts yellow in color. There was no significant difference in L value among control (Example 1) treated cheddar cheese (68.85), and 1.25% botanical extract (Example 3) (L=66.75), 2.5% botanical extract (Example 4) (L=67.02), and 10% botanical extract (Example 5) (L=67.90) treated cheddar cheese. The color variation was undetectable in the FAD anticaking agents due to the yellowish nature of dairy ingredients. The differences in appearance was not perceived in visual inspection, only spectrometry.

As shown in Table 14, browning and shredding of mozzarella upon pizza baking were slightly improved for PSB, CSB, and OSS anticaking agents. In contrast, the FAD anticaking agents with high botanical extract content (2.5% and 10%) created more browning pigment (rated as 2.5-3.0 points) compared with the control (rated as 3.5 points).

The results showed that incorporating botanical extract has little impact on the coating and anticaking efficacies of shredded cheese, typically when used at 2.5% or below. In addition, the browning of mozzarella cheese was not adversely affected by the botanical extract.

Example 4—Antimicrobial Activity

Five studies were conducted to evaluate the antifungal activity of the BE-containing anticaking agents on shredded cheese. Studies 1, 2, and 3 evaluated botanical extract's capacity to prevent the visible mold growth in shredded cheese that were contaminated by commensal flora and pathogens during handling and manufacturing process. Studies 4 and 5 were laboratory studies that evaluated the efficacy of botanical extracts anticaking agents for controlling the growth of specific mold/yeast species (*Aspergillus niger, Saccharomyces cerevisiae, Penicillium crustosum,* and *Kluyveromyces marxianus*) in shredded cheese.

Study 1

Study 1 examined the performance of the BE-containing anticaking agents (2.5%) in controlling the visible mold growth of cheese shreds contaminated by commensal flora and pathogens during cheese manufacture. The control was 400 ppm natamycin.

Low moisture part-skim mozzarella cheese and sharp cheddar cheese were obtained from a local grocery store and shredded using a food shredder (RobotCoupe™). The shredded cheese was smeared by hand evenly before mixing with anticaking agents, and stored in bags at 4-7° C. until use.

Each 96 g contaminated cheese shreds were treated with 4 grams of anticaking agents formulated with botanical extract (treatment group) and natamycin (control group) in a transparent bag. The bag was closed and manually shaken for two minutes to homogenize the sample then heat-sealed. The cheese bags were stored at 7, 15, and 23.5° C. Each treatment was duplicated.

All cheese bags were visually inspected for mold growth (appearance of mold, color, diameter, number, etc.) periodically. The time for mold to appear was recorded. Table 15 shows the microbial testing results of divided cheese products with anticaking agents Examples 1 to 4.

TABLE 15

Visible mold growth results of divided cheese products with a botanical-extract-containing potato starch-based anticaking agents

| Ex- | Storage temperature | | | | | |
|---|---|---|---|---|---|---|
| | 7° C. | | 15° C. | | 23.5° C. | |
| ample | Mozzarella | Cheddar | Mozzarella | Cheddar | Mozzarella | Cheddar |
| 2 | 1.250 | 1.120 | N/A | N/A | N/A | N/A |
| 1 | 2.472 | 2.179 | 3.151 | 3.151 | 1.000 | 1.000 |
| 3 | 1.543 | 1.342 | 1.988 | 1.988 | 1.988 | 1.988 |
| 4 | 2.472 | 2.179 | 3.151 | 3.151 | 3.151 | 3.151 |

*Result is shown as time for visible mold to appear in anticaking agent – treated cheese package / time for visible mold to appear in the cheese package without any anticaking agents Each Treatment was Performed in Duplicate.

As shown in Table 15, 2.5% botanical extract (Example 4) showed similar efficacy in inhibiting visible mold as the natamycin control (Example 1) at 7° C. and 15° C., and outperformed the control at 23.5° C. Specifically, at 7° C., the mold inhibition effect of 2.5% botanical extract (Example 4) was similar to natamycin 400 ppm (Example 1) at 7° C. The time for mold to be visible in Example 1 and Example 4 was 1.47 and 1.18 times longer than that of mozzarella cheese only and cheddar cheese only, respectively. At 23.5° C., the molding time of 1.25% (Example 3) and 2.5% botanical extract (Example 4) was 0.988, and 2.151 times longer than that of the control in both cheese samples.

The results from Study 1 showed that 2.5% botanical extract was as effective as natamycin 400 ppm in inhibiting the visible mold originated from the contamination of commensal flora in shredded cheese during manufacturing process (7° C.). The anti-mold efficacy of the botanical extract was more prominent under higher temperatures (15 and 25° C.).

Study 2

Study 2 examined the antifungal efficacy of the BE-containing anticaking agents (2.5% and 10%) against airborne pathogen contamination in cheese bags, compared with 400 ppm natamycin. In this experiment, 96 grams of shredded mozzarella/cheddar cheese was directly mixed with 4 g of anticaking agents formulated with botanical extract in a transparent bag. The treatment group was Examples 4, 5, 14, and 15, and the control group was Examples 1 and 11. Bags were closed and manually shaken for two minutes, heat sealed, and stored at 7° C. or 15° C. Each treatment was duplicated.

At pre-determined time points, the cheese bags were opened for one hour to expose them airborne pathogens. Twenty-five grams of Examples 1, 4, 11, and 14 treated cheeses was collected and sent to Merieux Nutrisciences Laboratories (Minnesota, USA) to enumerate the mold and yeast. The obtained cheese shreds were homogenized with 225-mL sterile phosphate buffered water using a stomacher. After homogenization, samples were serially diluted and pipetted into Petri dishes (1.0 ml), followed by pouring 15-20 mL Potato Dextrose Agar (PDA) with antibiotics. These plates were incubated at 22-25° C. for 5 days. Recovered microbial populations were calculated and reported as CFU/g. Each treatment was visually inspected for mold growth based on diameter, color, number of mold rings, and pictures. After sample collection, the bags were re-sealed and stored for further testing.

Tables 16-20 show the mold/yeast testing results of divided cheese products with experimental anticaking agents of Examples 1, 4, 5, 11, 14, and 15. Examples 1, 4, 5 PSB anticaking agents formulated with 400 ppm natamycin, 2.5% botanical extract, and 10% botanical extract, respectively. Examples 11, 14, and 15 are OSS anticaking agents formulated with 400 ppm natamycin, 2.5% botanical extract, and 10% botanical extract, respectively.

TABLE 16

Visible mold growth results of divided mozzarella cheese products with BE-containing anticaking agents stored at 15° C.

| | Mozzarella only | 1 | 4 | 5 | 11 | 14 | 15 |
|---|---|---|---|---|---|---|---|
| 0 day | – – | – – | – – | – – | – – | – – | – – |
| 15 days | + + | – – | – – | – – | – – | – – | – – |
| 30 days | + + | + + | + + | – – | – – | – – | – – |

* Result is shown as time for visible mold to appear in the example, anticaking agent treated cheese package.
The appearance of visible mold growth is shown as "+"; the absence of visible mold is shown as "–".

TABLE 17

Visible mold growth results of divided mozzarella cheese products with BE-containing anticaking agents stored at 7° C.

| | Mozzarella only | 1 | 4 | 5 | 11 | 14 | 15 |
|---|---|---|---|---|---|---|---|
| 0 day | – – | – – | – – | – – | – – | – – | – – |
| 30 days | + + | – – | – – | – – | – – | – – | – – |
| 60 days | + + | – – | – – | – – | – – | – – | – – |

* Result is shown as time for visible mold to appear in the example, anticaking agent treated cheese package.
The appearance of visible mold growth is shown as "+ +"; the absence of visible mold is shown as "– –".

TABLE 18

Visible mold growth results of divided cheddar cheese products with BE-containing anticaking agents stored at 15° C.

| | Cheddar only | 1 | 4 | 5 | 11 | 14 | 15 |
|---|---|---|---|---|---|---|---|
| 0 day | – – | – – | – – | – – | – – | – – | – – |
| 10 days | + + | + + | – – | – – | – – | – – | – – |
| 30 days | + + | + + | + + | – – | + + | + + | – – |

*Result is shown as time for visible mold to appear in Example anticaking agent treated cheese package.
The appearance of visible mold growth is shown as "+ +"; the absence of visible mold is shown as "– –".

TABLE 19

Visible mold growth results of divided cheddar cheese products with BE-containing anticaking agents stored at 7° C.

| | Cheddar only | 1 | 4 | 5 | 11 | 14 | 15 |
|---|---|---|---|---|---|---|---|
| 0 day | – – | – – | – – | – – | – – | – – | – – |
| 30 days | + + | + + | + + | – – | – – | – – | – – |
| 60 days | + + | + + | + + | – – | + + | + + | – – |

* Result is shown as time for visible mold to appear in the example, anticaking agent treated cheese package.
The appearance of visible mold growth is shown as "+ +"; the absence of visible mold is shown as "– –".

The results indicated that (1) incorporating antimicrobials delayed the visible mold growth in cheese bags, where Example 4 (12.5% botanical extract) performed comparably to Example 1 (natamycin control 400 ppm), and higher concentration of botanical extract Example (10% botanical extract) further delayed the mold growth. (2) OSS anticaking agents (Example 14, and 15) outperformed PSB anticaking agents (Example 4, and 5). (3) Higher temperature accelerated the development of visible mold.

For mozzarella cheese, cheese-only samples grew mold the fastest, showing visible mold at the first observation time point (15 days at 15° C. and 30 days at 7° C.), indicating that both natamycin and the botanical extract delayed the mold growth in natural cheese. At 7° C., no samples treated with an anticaking agent showed visible mold growth, compared with 15° C., indicating that low temperature substantially delayed the mold growth. At 15° C., Examples 1 and 4 showed visible mold at 30 days, where Example 5 (10% botanical extract) and OSS anticaking agents (Examples 11, 14, and 15) exhibited no mold growth. Such difference implied that, among PSB anticaking agents, the antifungal activity of 12.5% botanical extract was similar to natamycin 400 ppm. A high concentration of botanical extract (10%) was even more efficient. Examples 11, 14, and 15 did not support mold growth, as the oxygen-scavenging system eliminated the oxygen in the package.

Cheddar cheese exhibited a similar trend where natamycin/botanical extract, lower temperature, and the oxygen-scavenging system delayed mold growth. Compared with mozzarella, cheddar cheese was more susceptible to mold growth. At 15° C., Example 1 was moldy by day 10. Visible mold was observed in Examples 1, 4, 11, and 14 after 30 days of storage. At 7° C., Examples 1 and 4 were moldy by 30 days. Examples 1, 4, 11, and 14 all showed mold at day 60.

The analytical results included the number of mold/yeast growth in CFU/g) and are presented in Table 20. These results showed a similar pattern to visible mold growth, as

TABLE 20

Number of mold/yeast growth (FDA-BAM, 7th ed.) in divided cheese products treated with BE-containing anticaking agents (CFU/g)

| | | | Mozzarella Cheese | | | | |
|---|---|---|---|---|---|---|---|
| Test | Time, Temp | Cheese only | 1 | 4 | 11 | 14 |
| Mold | 15 D, 15° C. | $>1.5 \times 10^5$ | <10 | <10 | — | — |
| | 30 D, 15° C. | $>1.5 \times 10^5$ | $>1.5 \times 10^5$ | $>1.5 \times 10^5$ | | |
| | 30 D, 7° C. | $>1.5 \times 10^5$ | <10 | <10 | <10 | 10 |
| | 60 D, 7° C. | $>1.5 \times 10^5$ | $>1.5 \times 10^5$ | $6.5 \times 10^4$ | <10 | 3645 |
| Yeast | 15 D, 15° C. | $>1.5 \times 10^5$ | $>1.5 \times 10^5$ | $>1.5 \times 10^5$ | — | — |
| | 30 D, 15° C. | $>1.5 \times 10^5$ | $>1.5 \times 10^5$ | $>1.5 \times 10^5$ | | |
| | 30 D, 7° C. | $>1.5 \times 10^5$ | $>1.5 \times 10^5$ | $>1.5 \times 10^5$ | 215 | 345 |
| | 60 D, 7° C. | $>1.5 \times 10^5$ | $>1.5 \times 10^5$ | $>1.5 \times 10^5$ | $>1.5 \times 10^5$ | 74500 |

| | | | Cheddar Cheese | | | | |
|---|---|---|---|---|---|---|---|
| Test | Time, Temp | Cheese only | 1 | 4 | 11 | 14 |
| Mold | 10 D, 15° C. | $>1.5 \times 10^5$ | 39000 | 360 | — | — |
| | 30 D, 15° C. | $>1.5 \times 10^5$ | $>1.5 \times 10^5$ | $>1.5 \times 10^5$ | | |
| | 30 D, 7° C. | $>1.5 \times 10^5$ | $>1.5 \times 10^5$ | $>1.5 \times 10^5$ | <10 | 10 |
| | 60 D, 7° C. | $>1.5 \times 10^5$ | $>1.5 \times 10^5$ | $>1.5 \times 10^5$ | $>1.5 \times 10^5$ | $>1.5 \times 10^5$ |
| Yeast | 10 D, 15° C. | $>1.5 \times 10^5$ | 9150 | <10 | — | — |
| | 30 D, 15° C. | $>1.5 \times 10^5$ | $>1.5 \times 10^5$ | <10 | | |
| | 30 D, 7° C. | $>1.5 \times 10^5$ | 11000 | <10 | 35 | <10 |
| | 60 D, 7° C. | $>1.5 \times 10^5$ | 30 | <10 | <10 | <10 | shown in Tables 16-19. Generally, (1) 12.5% botanical extract (Example 4) was as effective as natamycin 400 ppm (Example 1). (2) OSS anticaking agents were more efficient in inhibiting yeast and mold than PSB anticaking agents. (3) Antimicrobials (natamycin/botanical extract) in PSB anticaking agents were more efficient at inhibiting mold growth in mozzarella cheese and yeast in cheddar cheese. And (4) lower temperatures delayed the growth of mold and yeast.

As shown in Table 20, for mozzarella cheese, the mold growth of Examples 1 and 4 was similar at 7 and 15° C. At 15° C., the mold growth of both Example 1 and 4 increased from day (<10 CFU/g mold) to day 30, reaching a mold count of >1.5×10 5 CFU/g. The mold growth at 7° C. showed a similar trend, except for Example 4, where the mold count (6.5×10 4 CFU/g) was less than Example 1 (>1.5×10 5 CFU/g) at day 60. Examples 1 and 4 showed no antimicrobial effect against yeast. The yeast count for all samples was >1.5×10 5 CFU/g under all storage conditions. At 7° C., Examples 11 and 14 both showed much stronger antimicrobial capacity than the PSB anticaking agents (Example 1 and 4). The colony counts of Examples 11 and 14 ranged from 10 to 3,645 CFU/g for mold, and 215 to >1.5×10 5 CFU/g for yeast.

For cheddar cheese, similar growth patterns were found. The yeast count of Example 1 ranged from 30 to >1.5×10 5 CFU/g. Example 4 yeast growth was <10 CFU/g under all conditions. Example 4 prevented yeast growth in cheddar cheese more effectively compared to Example 1. The mold growth of Examples 1 and 4 increased from day 15 (360-39,000 CFU/g mold) to day 30 at 15° C., reaching a mold count of >1.5×10 5 CFU/g, indicating that the botanical extract and natamycin similarly inhibited mold growth. The advantage of botanical extract Example 4 was more evident at day 10, where Example 4 mold count was 360 CFU/g, compared with Example 1 of 39,000 CFU/g. The mold growth under 7° C. did not differ appreciably. The mold counts of all time points were >1.5×10 5 CFU/g. Examples 11 and 14 reduced the yeast number to <10 CFU/g and inhibited mold growth for up to a month under 7° C. with a mold count of <10.

Overall, the results indicated that natamycin 400 ppm and 12.5% botanical extract similarly controlled visible mold growth in cheese. The analytical results indicated that the sample with 2.5% botanical extract was slightly more effective than the control. A concentration of botanical extract of 10% further delayed visible mold growth. The superior performance of OSS anticaking agents (Examples 11, 14, and 15) indicated that eliminating oxygen in the cheese package prevented potential pathogen contamination during processing.

Study 3

Studies 1 and 2 demonstrated that 2.5% botanical extract and 400 ppm natamycin had similar antimicrobial efficacies. To validate the efficacy of botanical extract at low concentrations, Study 3 examined the antifungal efficacies of 4-fold diluted natamycin control (100 ppm) was with 4-fold diluted (0.63%). The oxygen-scavenging system-based anticaking agents were included to study the antimicrobial effects. No airborne pathogens or commensal flora was introduced. (That is, the package was not reopened in this Study.)

Cheese samples (96 g) were mixed with the anticaking agent (4 g) formulated with antimicrobials (botanical extract/natamycin) in the bag. Bags were closed and manually shaken for two minutes to mix. A 25 g portion of each sample was placed in sterile plastic bags heat sealed and stored at 7° C. or 15° C. Each treatment was duplicated. The efficacy of the antimicrobial treatments was evaluated by visual inspection and enumerating yeast/mold growth at pre-determined time points.

To quantify the population of mold/yeast, a 25-gram sample of cheese was aseptically obtained from each bag and sent to the Merieux NutriSciences (Silliker® Food Science Center, Minnesota, USA) to test for yeast and mold. The 25-gram samples were homogenized with 225-mL sterile phosphate buffered water using a stomacher. After homogenizing, the mixture was serially diluted and pipetted into Petri dishes (1.0 ml), followed by pouring 15-20 mL PDA with antibiotics. These plates were incubated at 22-25° C. for 5 days. Recovered populations were calculated and reported as CFU/g.

Tables 21 and 22 show the compositions of botanical extract and natamycin-containing anticaking agents used in Study 3. Tables 23-27 show the mold/yeast testing results of divided cheese products with experimental anticaking agents Examples 21-28.

TABLE 21

Antimicrobial Study 3-PSB anticaking agents

| Ingredient | Example (wt. %) | | | |
| --- | --- | --- | --- | --- |
| | 21 | 22 | 23 | 24 |
| Potato starch | 99.94% | 96.82% | 99.88% | 87.45% |
| Tapioca starch | — | 2.50% | — | 10.00% |
| Botanical extract | — | 0.63% | — | 2.50% |
| Delvo ® Cid (50% natamycin) | 0.02% | — | 0.08% | — |
| Mineral Oil | 0.03% | 0.03% | 0.03% | 0.03% |
| Silica | 0.02% | 0.02% | 0.02% | 0.02% |

TABLE 22

Antimicrobial Study 3-OSS anticaking agents

| Ingredient | Example (wt. %) | | | |
| --- | --- | --- | --- | --- |
| | 25 | 26 | 27 | 28 |
| Potato starch | 71.59% | 69.53% | 71.65% | 59.16% |
| Tapioca Starch | — | 2.50% | — | 10.00% |
| Botanical extract | — | 0.63% | — | 2.50% |
| Salt | 1.00% | 1.00% | 1.00% | 1.00% |
| Dextrose | 25.00% | 25.00% | 25.00% | 25.00% |
| Calcium sulfate | 1.99% | 1.99% | 1.99% | 1.99% |
| Delvo ® Cid (50% natamycin) | 0.08% | — | 0.02% | — |
| Glucose oxidase | 0.30% | 0.30% | 0.30% | 0.30% |
| Mineral oil | 0.03% | 0.03% | 0.03% | 0.03% |
| Silica | 0.02% | 0.02% | 0.02% | 0.02% |

TABLE 23

Visible mold growth results of divided mozzarella cheese products with BE-containing anticaking agents stored at 15° C.

| | Mozzarella cheese-only | Example (wt. %) | | | | | | | |
|---|---|---|---|---|---|---|---|---|---|
| | | PSB | | | | OSS | | | |
| Time | | 21 | 22 | 23 | 24 | 25 | 26 | 27 | 28 |
| 0 days | -- | -- | -- | -- | -- | -- | -- | -- | -- |
| 12 days | ++ (1 mold for each sample, 0.2-0.3 cm radius, dark green color) | +- (1 mold in the sample, 0.2-0.3 cm radius, dark green color) | -- | -- | -- | ++ (1 mold for each sample, 0.2-0.3 cm radius, dark green color) | +- (1 mold in the sample, 0.1 cm radius, dark green color) | -- | -- |
| 30 days | ++ (100% mold coverage) | ++ (100% mold coverage) | +- | -- | -- | ++ (100% mold coverage) | ++ (30-50% mold coverage) | -- | -- |

TABLE 25

Visible mold growth results of divided mozzarella cheese products with BE-containing anticaking agents stored at 7° C.

| | Mozzarella cheese-only | Example (wt. %) | | | | | | | |
|---|---|---|---|---|---|---|---|---|---|
| | | PSB | | | | OSS | | | |
| Time | | 21 | 22 | 23 | 24 | 25 | 26 | 27 | 28 |
| 0 days | -- | -- | -- | -- | -- | -- | -- | -- | -- |
| 30 days | ++ (10-30% mold coverage) | ++ (1 mold with 0.2 cm diameter) | -- | -- | -- | -- | -- | -- | -- |

TABLE 26

Visible mold growth results of divided cheddar cheese products with BE-containing anticaking agents stored at 7° C.

| | Cheddar cheese-only | Example (wt. %) | | | | | | | |
|---|---|---|---|---|---|---|---|---|---|
| | | PSB | | | | OSS | | | |
| Time | | 21 | 22 | 23 | 24 | 25 | 26 | 27 | 28 |
| 0 days | -- | -- | -- | -- | -- | -- | -- | -- | -- |
| 30 days | ++ (1 bag is 10-20% mold coverage, 1 bag jas 2 0.2 cm diameter mold) | +- (2 0.5-1 cm diameter mold) | -- | -- | -- | -- | -- | -- | -- |

TABLE 27

Number of mold/yeast growth (FDA-BAM, 7th ed.) in divided cheese products treated with BE-containing anticaking agents (CFU/g)

| | Mozzarella cheese 30 days, 7° C. | | Cheddar cheese 30 days, 7° C. | |
|---|---|---|---|---|
| Sample | Mold | Yeast | Mold | Yeast |
| Cheese only | >1.5 × 10$^5$ | <10 | >1.5 × 10$^5$ | >1.5 × 10$^5$ |
| 21 | 69000 | <10 | >1.5 × 10$^5$ | 55000 |
| 22 | <10 | 110 | 13000 | 2300 |
| 23 | <10 | 70 | <10 | <10 |
| 24 | <10 | <10 | <10 | <10 |
| 25 | <10 | 30 | >1.5 × 10$^5$ | 90 |
| 26 | <10 | 70 | <10 | 60 |
| 27 | <10 | <10 | <10 | 6500 |
| 28 | <10 | 20 | <10 | 10 |

According to the results, a lower temperature of 7° C. exhibited stronger antimicrobial efficacy than 15° C. Over 30 days of incubation at 7° C., except for cheese only and Example 21, all other samples were free from visible mold. In contrast, all samples had molded after 30 days of incubation at 15° C. except for Examples 24 and 28.

Cheese-only samples showed visible mold at the first observation point under all storage conditions with the highest percentage of mold coverage. Antimicrobials incorporated anticaking agents (Examples 21-28) impeded visible mold growth on various levels. Comparing PSB (Examples 21-24) with OSS anticaking agents (Examples 25-28), OSS anticaking agents generally had fewer cheese bags contaminated with visible mold across all temperatures and concentration levels of antimicrobials. For example, at 15° C., Example 23 (400-ppm natamycin) treated cheese shreds had visible mold, while the same natamycin level was free from mold growth for the OSS treatment (Example 27).

Within the PSB anticaking agents treatment group, natamycin 100 ppm (Example 21) supported visible mold growth under all storage conditions. At the same time, the anticaking agent with 0.63% botanical extract (Example 22) only showed visible mold at 30 days at 15° C. The mold coverage of Example 23 (400 ppm natamycin) reached 20% at 30 days (15° C.), while Example 24 had no visible mold. The growth pattern of the oxygen-scavenging system resembled potato starch-based anticaking agents. For example, at 15° C., the mold coverage of natamycin 100 ppm (Example 25) was much higher than 0.63% botanical extract (Example 26), reaching 10-50% mold coverage for cheddar cheese. Such difference demonstrated that botanical extract was more potent in inhibiting mold growth than natamycin at equivalent concentration levels.

The analytical results of mold/yeast growth (CFU/g) at 7° C. are presented in Table 29. These results showed a similar pattern for visible mold growth. (See Tables 27 and 28). Generally, (1) the anticaking agents containing 2.5% and 0.63% botanical extract were slightly more effective than natamycin 400 and 100 ppm, respectively. (2) The OSS anticaking agents performed better than the PSB formula for both mold and yeast. And (3) antimicrobials (natamycin/botanical extract) in PSB anticaking agent are more efficient in inhibiting mold growth in mozzarella cheese and yeast in cheddar cheese.

As shown in Table 29, for cheddar cheese, natamycin and botanical extract both delayed the mold and yeast growth compared with cheese only, where botanical extract outperformed natamycin at all concentration levels. Specifically, within the PSB or OSS anticaking agent groups, 0.63% botanical extract (Examples 22 and 26) showed less mold/yeast growth than 100 ppm natamycin (Examples 21 and 25). A similar growth pattern was seen for 400 ppm natamycin and 12.5% botanical extract, the mold and yeast count of botanical extract (Examples 24 and 29) was less or equal to 400 ppm natamycin (Examples 23 and 27). The only exception was the yeast growth in mozzarella cheese, where Examples 22, 23, 25, 26, and 28 showed slightly higher yeast count compared with cheese only.

In conclusion, without commensal flora or airborne pathogen contamination, the botanical extract was slightly more effective in controlling mold and yeast growth than natamycin at equivalent concentration levels Eliminating oxygen with the OSS anticaking agents further inhibited mold contamination. That is, as also seen in Studies 1 and 2, the botanical extract is compatible with the oxygen-scavenging system, with their positive effects being at least additive.

Study 4

Study 4 is a laboratory study that evaluated the antimicrobial activity and applicability of botanical extract (2.5% and 10.0%) for controlling *Aspergillus niger* (mold) and *Saccharomyces cerevisiae* (yeast) in shredded cheese with experimental anticaking agents. The control was 400 ppm natamycin.

A mold (*Aspergillus niger* ATCC 16888) and yeast (*Saccharomyces cerevisiae*) were acquired from Dr. Arun Bhunia (Food Science Dept, Purdue University) and American Type Culture Collection (ATCC). Pure colonies were isolated from PDA and cultured aerobically at 25° C. for 3-5 days to prepare an inoculum stock. The counts in the inoculum stock were determined by serial dilution followed by plating. Approximately 3-4 log CFU/g fungal cells were inoculated into cheese products.

Anticaking agents formulated with botanical extract, S3 (2.5%) and S4 (10.0%), were used as the experimental group. S2 (natamycin 400 ppm control) was used as a positive control. For reference, a negative control S1 was prepared using potato starch without antimicrobials. The compositions of S1-S4 are summarized in Table 28.

TABLE 28

Antimicrobial Study 4-PSB anticaking agents

| Ingredient | Example (wt. %) | | | |
|---|---|---|---|---|
| | S1 | S2 | S3 | S4 |
| Potato starch | 99.95% | 99.88% | 87.46% | 49.96% |
| Tapioca starch | — | — | 10.00% | 40.00% |
| Botanical extract | — | — | 2.50% | 10.00% |
| Delvo ® Cid (50% natamycin) | — | 0.08% | — | — |
| Mineral Oil | 0.03% | 0.03% | 0.03% | 0.03% |
| Silica | 0.02% | 0.02% | 0.02% | 0.02% |

Around 500 g of low moisture part-skim mozzarella cheese and cheddar cheese were shredded using a cheese shredder equipped with pre-sterilized 6 mm and 3 mm blades, respectively. Cheese samples (96 g) were mixed with the anticaking agent (4 g) prepared with antimicrobials S1-S4. A 10 g portion of each sample was distributed in sterile plastic bags and inoculated either with *Aspergillus niger* or *Saccharomyces cerevisiae* at ~3-4 log CFU/g, shaken for two minutes to mix, and stored at 4° C. until analysis. The efficacy of the antimicrobial treatments was evaluated by observing and measuring mold/yeast growth in the samples.

Each treatment was enumerated for mold/yeast populations at inoculation (0 D) and after day (5 D), 10 days (10 D), and 20 days (20 D) of refrigerated storage. A 5-g sample from each treatment was placed in separate stomacher bags. A total of eight stomacher bags were collected, and each pull time was duplicated. The stomacher bags were heat sealed and stored at 4° C. until analysis. The bags were also visually inspected for mold growth during the 20 days of storage.

On the day of plating, each replicate bag was diluted with 15 mL of buffered peptone water (BPW) and homogenized by blending in a stomacher for one minute. After homogenization, samples were serially diluted up to 10-3 and spread plated (0.1 ml) onto PDA, and plates were incubated at 25° C. for 3-5 days. Microbial counts were reported as Logic, CFU/g. All the dilutions (including undiluted stock) were also plated on PDA and incubated at 30° C. for three days before enumeration.

Figure 5:
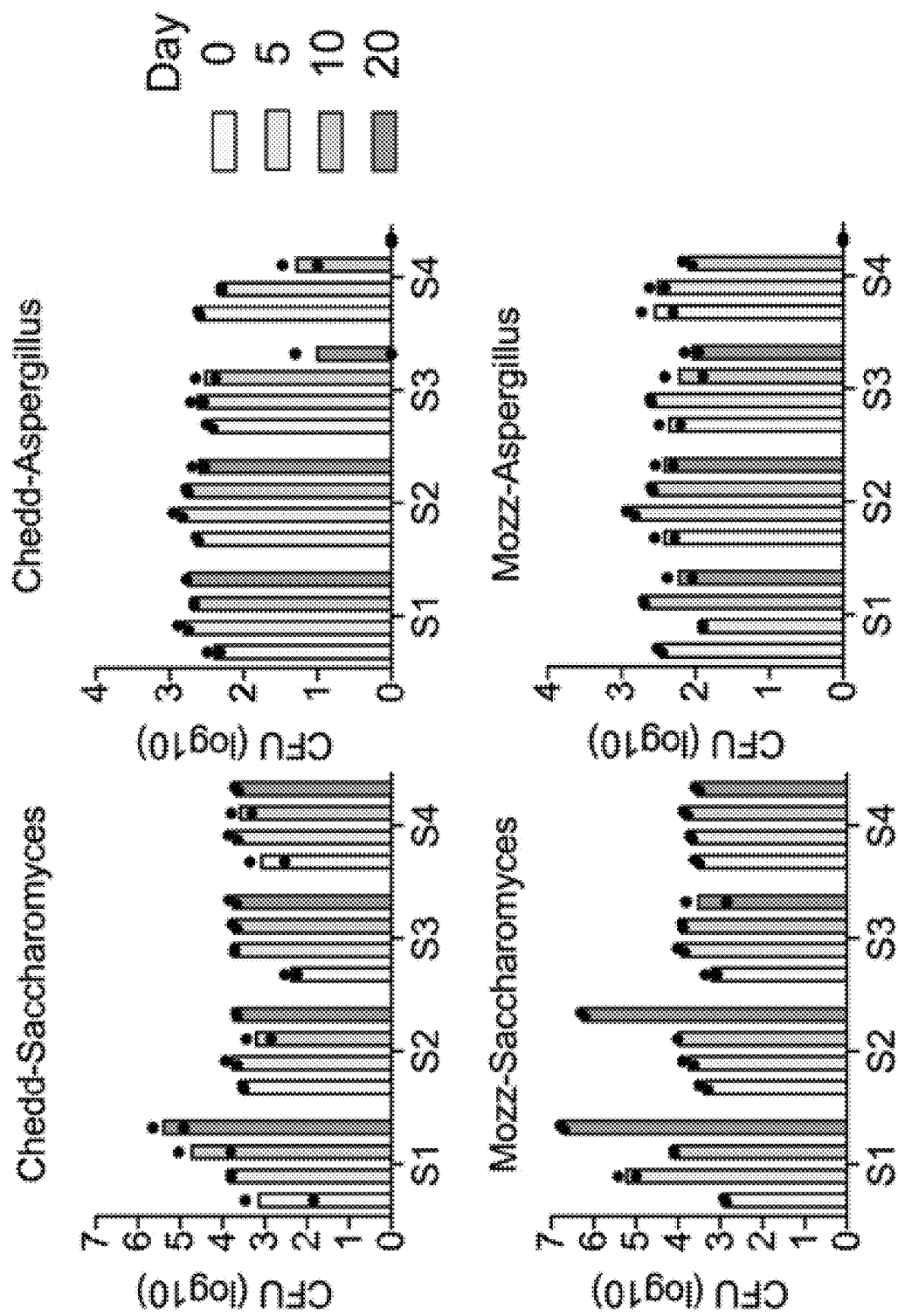
FIG. 5 shows the Saccharomyces and Aspergillus colony counts from cheddar and mozzarella cheeses treated with samples S1, S2, S3, and S4 after 20 days of storage at 4° C. S1 is a PSB anticaking agent without natamycin, a negative control. S2 is Example 1 (PSB anticaking agent containing 400 ppm natamycin). S3 is Example 4 (PSB anticaking agent containing 2.5% botanical extract). S4 is Example 5 (PSB anticaking agents containing 10% of the extract).
Figure 6:
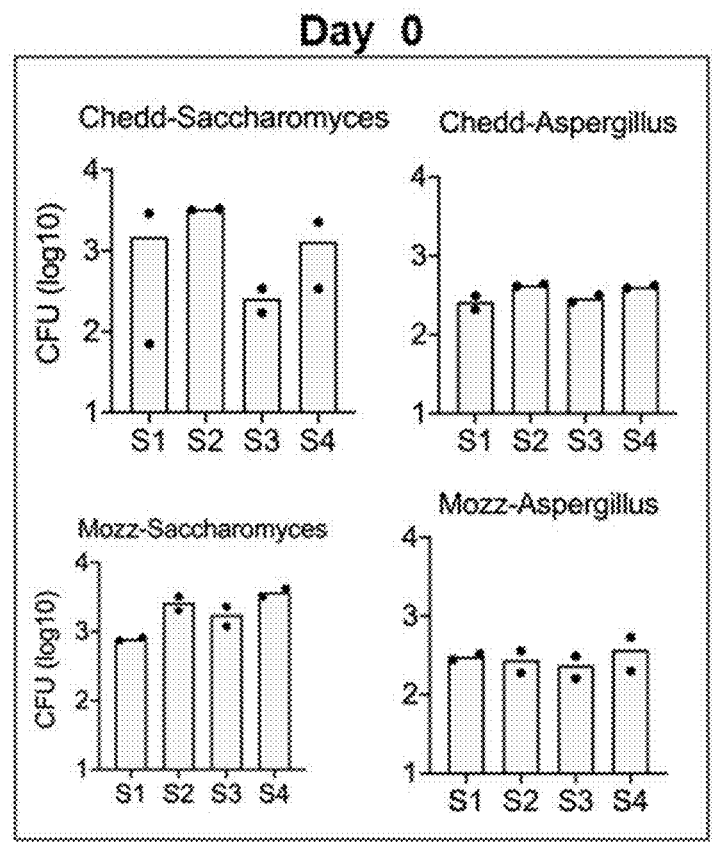
FIG. 6 shows the Saccharomyces and Aspergillus counts from cheddar and mozzarella cheeses treated with samples S1, S2, S3, and S4 before storage (Day 0).
Figure 7:
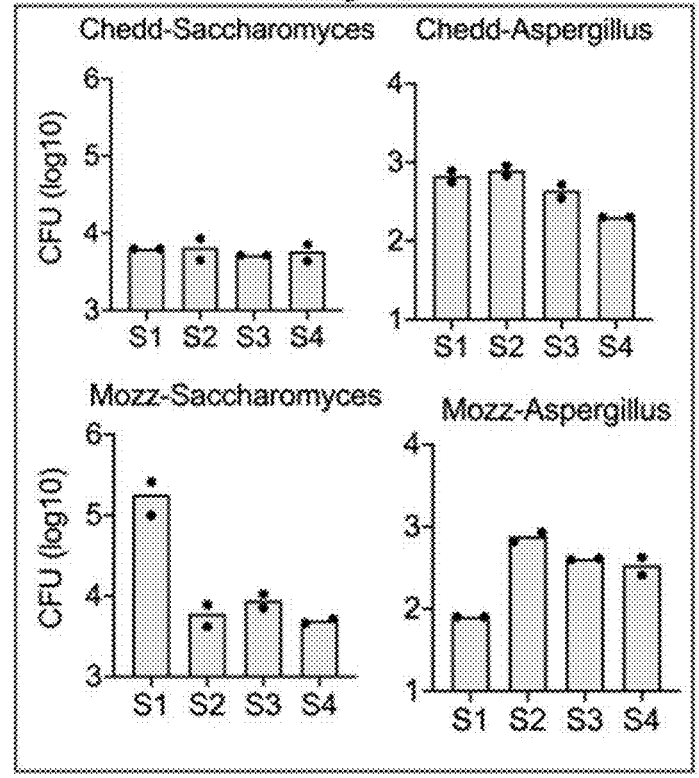
FIG. 7 shows the Saccharomyces and Aspergillus counts from cheddar and mozzarella cheeses treated with samples S1, S2, S3, and S4 after 5 days of storage at 4° C.
Figure 8:
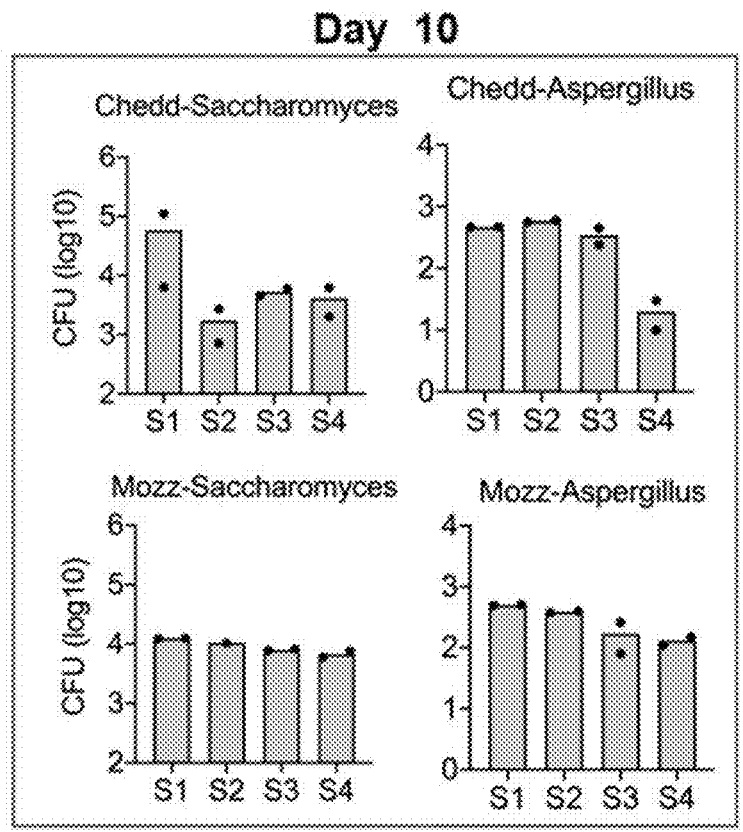
FIG. 8 shows the Saccharomyces and Aspergillus counts from cheddar and mozzarella cheeses treated with samples S1, S2, S3, and S4 after 10 days of storage at 4° C.
Figure 9:
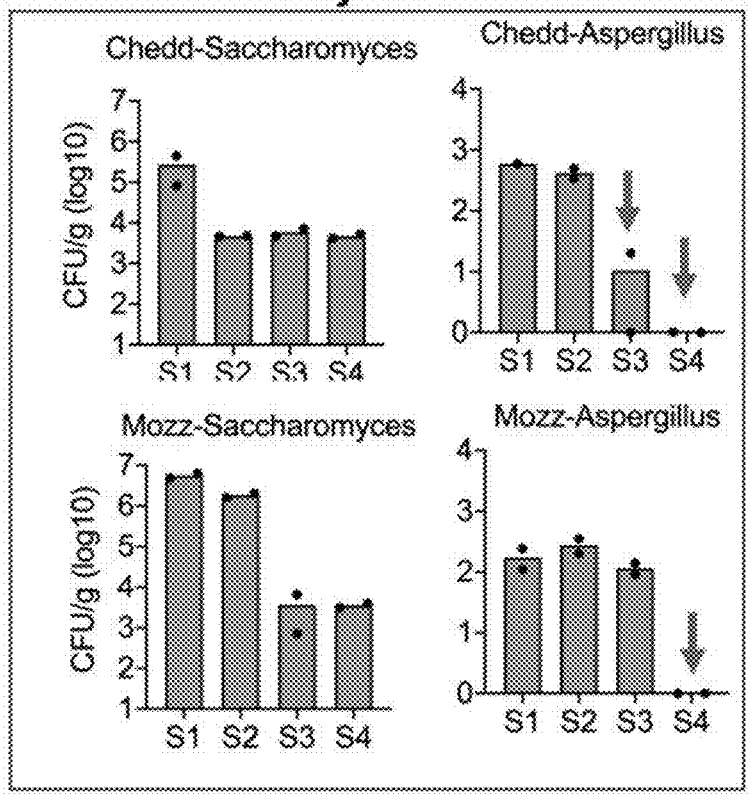
FIG. 9 shows the Saccharomyces and Aspergillus counts from cheddar and mozzarella cheeses treated with samples S1, S2, S3, and S4 after 20 days of storage at 4° C.
Figure 10:
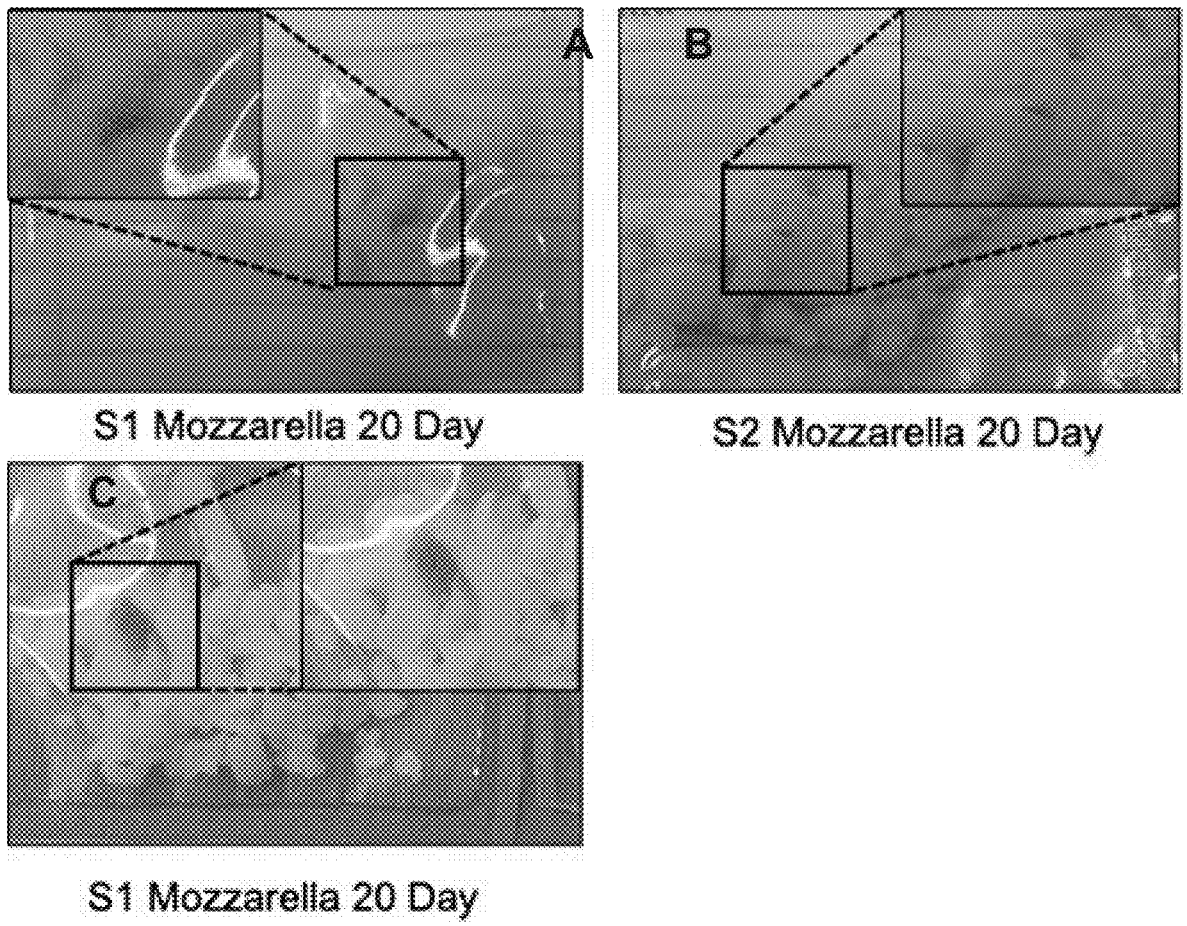
FIG. 10 shows visible fungal growth on mozzarella after 20 days of storage with S1 and S2.
Figure 11:
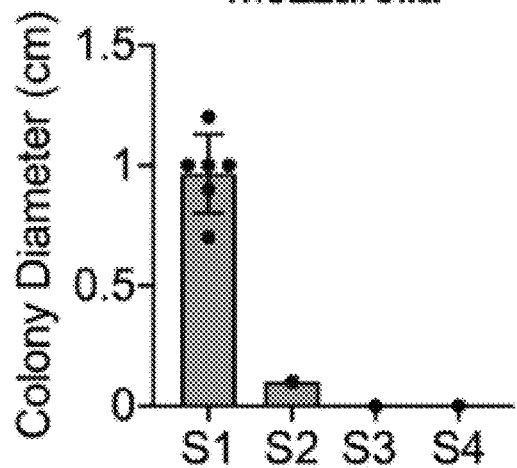
FIG. 11 shows the approximate colony diameter of fungal growth on mozzarella after 20 days of storage with S1 and S2.
Figure 12:
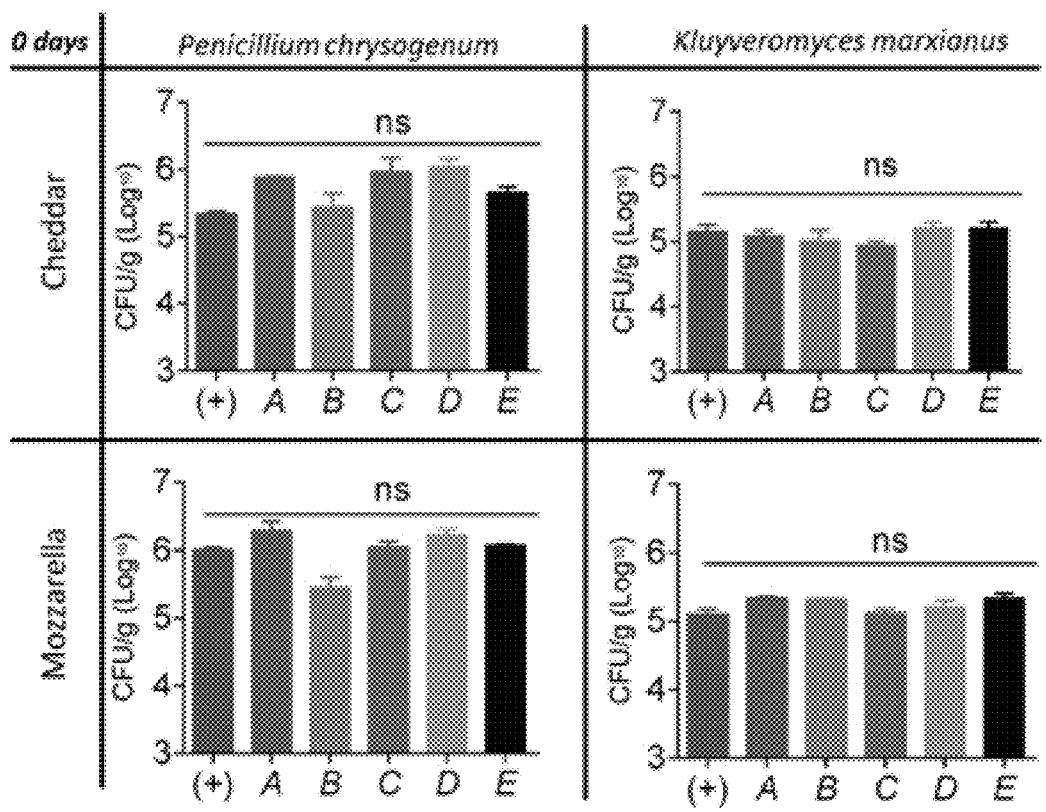
FIG. 12 shows Penicillium chrysogenum (mold), and Kluyveromyces marxianus (yeast) colony counts from cheddar and mozzarella cheeses treated with samples A, B, C, D, and E before storage Day 0. The "+" symbol designates cheese only without any treatment. "A" is a PSB anticaking agent containing 1.25 wt. % of the botanical extract. "B" is a PSB anticaking agent containing 2.5 wt. % of the botanical extract. "C" is a PSB anticaking agent containing 5 wt. % of the botanical extract. "D" is a PSB anticaking agent containing 200 ppm natamycin. "E" is a PSB anticaking agent containing 400 ppm natamycin.
Figure 13:
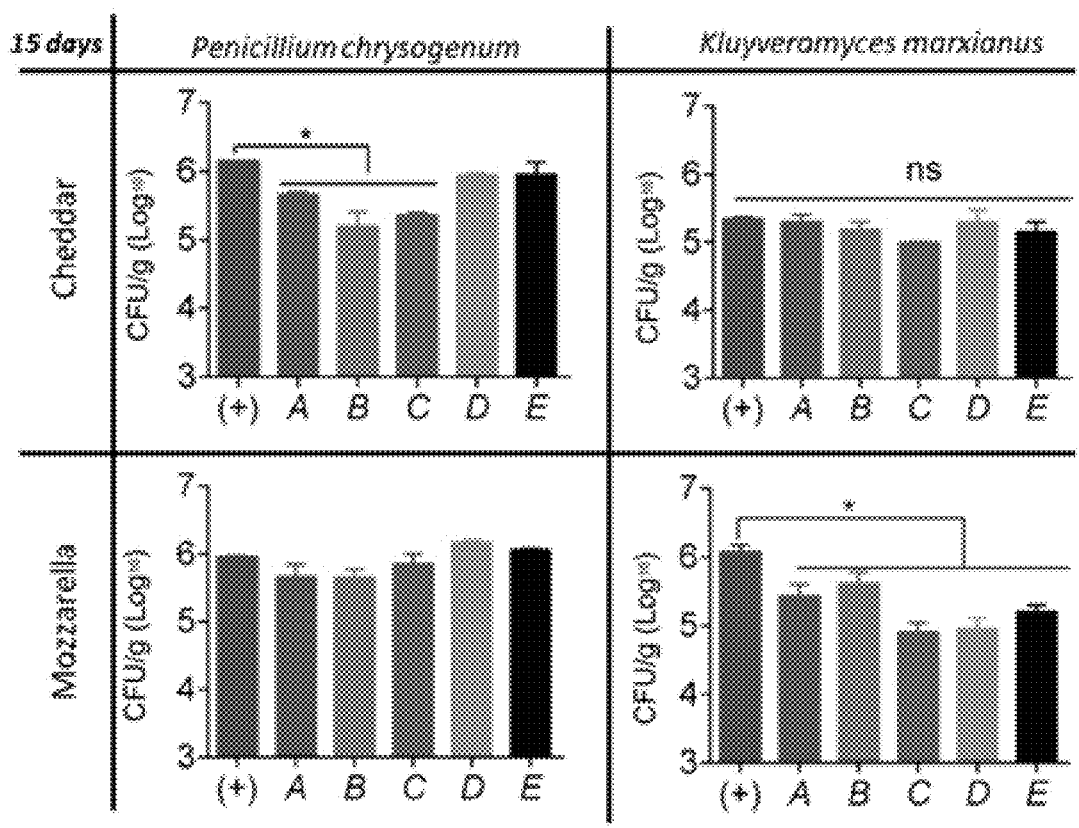
FIG. 13 shows Penicillium chrysogenum (mold) and Kluyveromyces marxianus (yeast) colony counts from cheddar and mozzarella cheeses treated with samples A, B, C, D, and E after days of storage at 4° C.
Figure 14:
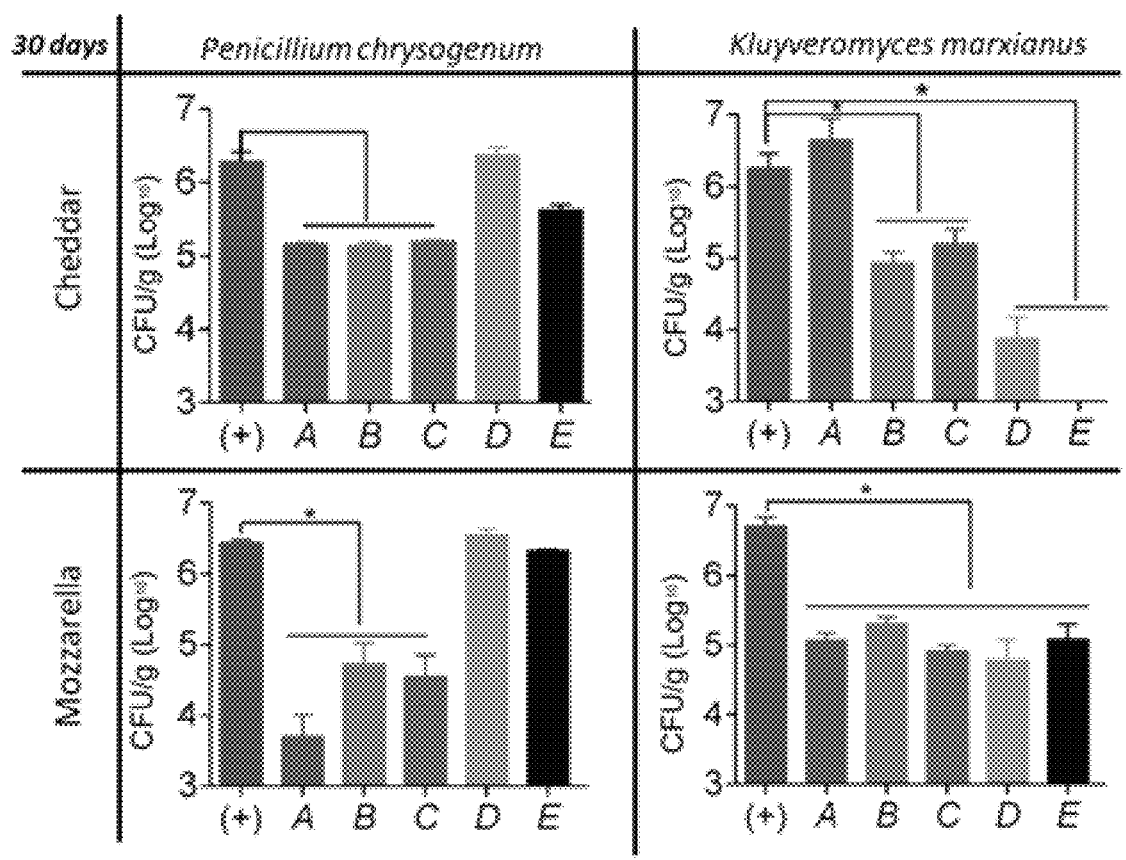
FIG. 14 shows Penicillium chrysogenum (mold) and Kluyveromyces marxianus (yeast) colony counts from cheddar and mozzarella cheeses treated with samples A, B, C, D, and E after days of storage at 4° C.
Figure 15:
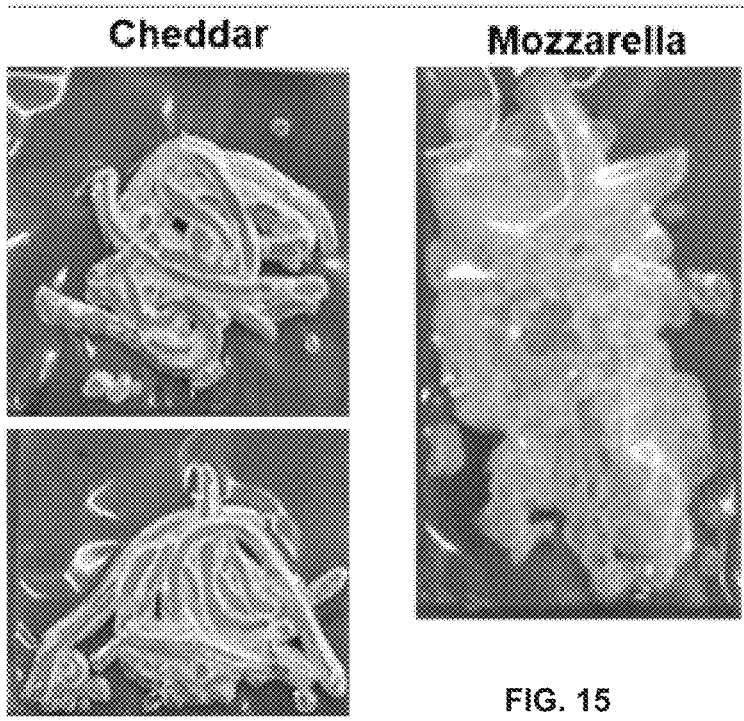
FIG. 15 are photographs showing the visible growth of Penicillium chrysogenum on cheddar and mozzarella untreated positive controls.

The analytic results (FIGS. 5-11) showed the antimicrobial efficacy of botanical extract anticaking agents (S3 and S4) compared with that of natamycin 400 ppm control (S2). FIGS. 5-9 showed that yeast and mold growth on cheddar cheese at 4° C. varied depending on their treatment. Specifically, *Saccharomyces* growth for no antimicrobial group (S1) exhibited a gradual increase over storage time from day 0 to day 20, reaching a count of 5.5 log CFU/g (FIG. 1*n* contrast, antimicrobials (S2-S4) treated shredded cheese maintained an initial inoculum count of 3.5 log CFU/g throughout 20 days (FIG. 5). The colony counts of *Aspergillus* for no treatment (S1) and natamycin 400 ppm (S2) treated shredded cheese showed similar results over storage, maintaining an initial inoculum count of 3 log CFU/g (FIG. 9). S3 (2.5% botanical extract) maintained a similar count until day ten (FIG. 8), but the count was significantly decreased (~1 log CFU/g) on day 20 (FIG. 9). The colony count for the S4 treatment decreased over time, reaching an undetectable level on day 20 (FIG. 9). These results demonstrated that treatment with antimicrobials (S2-S4) maintained the initial inoculum level of *Saccharomyces* counts over 20 days without supporting/promoting their growth. On the other hand, no antimicrobial (S1) and natamycin 400 ppm (S2) treatment maintained *Aspergillus* counts to initial inoculum levels on cheddar cheese until day 20. In contrast, treatment with S3 significantly reduced *Aspergillus* counts on day 20. Treatment with S4 gradually decreased to an undetectable level until day 20. See FIG. 9, emphasized with downward pointing arrows.

On mozzarella, mold and yeast growth rates were very similar to cheddar cheese after treatments S1-S4 (FIGS. 5-9). Similar to cheddar cheese, S1 showed a gradual increase in *Saccharomyces* counts over the 20 days (FIG. 5). The count of S2 remained relatively unchanged until day 20, when the count increased dramatically. *Saccharomyces* inhibitory effect of natamycin 400 ppm (S2) was not observed in mozzarella (FIG. 5). The *Aspergillus* counts were maintained at the inoculation level from day 0 to 20 for all treatment groups (S1-S4), except for day 20, when the *Aspergillus* count was determined to be below the detection limit (FIG. 9).

In conclusion, mold and yeast growth increased with no antimicrobial treatment (S1 negative control) over 20 days of storage at 4° C. Treatment with natamycin 400 ppm (S2) did not support the growth of *Saccharomyces* on cheddar from day 0 to 20, similar to mozzarella cheese, except for the strong growth observed on day 20. Treatment with anticaking agents containing 2.5% (S3) and 10% botanical extract (S4) did not support the growth of *Saccharomyces* or *Aspergillus* on either type of cheese. Rather, they exhibited an inhibitory effect on *Aspergillus*, reaching an undetectable level after 20 days of storage at 4° C.

Study 5

Study 5 is a laboratory study that evaluated the antimicrobial activity and applicability of the BE-containing anticaking agents (1.25%, 2.5%, and 5% concentration levels) in controlling *Penicillium chrysogenum* (ATCC 10106) and *Kluyveromyces marxianus* (ATCC 200963) (Manassas, VA). The controls were 200 and 400 ppm natamycin. Natamycin is regulated as a food additive by FDA when applied to cheese; levels may not exceed 20 ppm in the finished product ("generally regarded as safe" (GRAS), 21 CFR § 172.155, FDA-ASP/1577, 007681-93-8). Therefore, the test did not include equivalent 5% botanical extract control, which is 800 ppm natamycin. The selected mold and yeast species are known to spoil cheese.

Anticaking agents formulated with botanical extract, A (1.25% botanical extract), B (2.5% botanical extract), and C (5% botanical extract), were the experimental group. D (natamycin 200 ppm control) and E (natamycin 400 ppm control) were the positive controls. For reference, a positive control (+) cheese was treated with no antimicrobials. The compositions of A-E are summarized in Table 29.

TABLE 29

Antimicrobial Study 5 Potato starch-based (PSB) anticaking agents

| Ingredient | Example (wt. %) | | | | |
|---|---|---|---|---|---|
| | A | B | C | E | D |
| Potato starch | 93.70% | 87.45% | 74.95% | 99.87% | 99.91% |
| Tapioca Starch | 5.00% | 10.00% | 20.00% | — | — |
| Botanical extract | 1.25% | 2.50% | 5.00% | — | — |
| Delvo ® Cid (50% natamycin) | — | — | — | 0.08% | 0.04% |
| Mineral Oil | 0.03% | 0.03% | 0.03% | 0.03% | 0.03% |
| Silica | 0.02% | 0.02% | 0.02% | 0.02% | 0.02% |

To prepare the microbial cultures, *Penicillium chrysogenum* (ATCC 10106) was purchased from ATCC (Manassas, VA), and *Kluyveromyces marxianus* (ATCC 200963) was collected from Dr. Eun-Joon Oh (Food Science Dept, Purdue University). Both mold and yeast species were known to cause cheese spoilage. Freeze-dried cultures were rehydrated and grown aerobically at 25° C. for 3-5 days using PDA medium (BD diagnostics) as an inoculum.

Low moisture part-skim mozzarella cheese and cheddar cheese were obtained from a local grocery store, shredded (96 g), and mixed with the anticaking agents (4 g). After that, the cheese samples were inoculated with yeast and mold at target levels of 3-4 log CFU/g. Cheese bags were closed and manually shaken for two minutes before heat sealing and storage at 4° C.

The efficacy of the antimicrobial treatments was evaluated by observing visible mold growth (periodically) and enumerating the mold and yeast counts on day 0, day 15, and day 30.

Mold and yeast populations were enumerated immediately after inoculation on day 0, day and day 30 of refrigerated storage. A 2.5-gram sample of each cheese was aseptically obtained from each bag, added to 22.5 ml of 0.1% peptone diluent, and homogenized by blending in a stomacher for one minute. Afterward, the homogenized cheese suspension was serially diluted (10-4) and spread plated (0.1 ml) onto PDA medium. The plates were incubated at ° C. for 3-5 days. Recovered populations were calculated and reported as Logic, CFU/g.

Antimicrobial effect of botanical extract treatments and natamycin (blinded) in cheddar and mozzarella cheese stored at 4° C. at day 0, day 15, and day 30 are presented in FIGS. 12-15 for both *Penicillium chrysogenum* (mold) and *Kluyveromyces marxianus* (yeast) strains. FIGS. 12-15 showed that yeast and mold growth on cheese at 4° C. varied depending on the treatment they received.

Mold/Yeast Growth in Cheddar Cheese

Regarding the growth of *Penicillium chrysogenum*, the no-treatment (+) cheese exhibited a gradual increase of microbe from 5.2 (day 0) to 6.2 log CFU/g (day 30). Natamycin 200 ppm showed similar growth dynamics, reaching a colony number of 6.4 log CFU/g at day 30. Cheddar cheese treated with natamycin 400 pm maintained the colony counts over 30 days (5.5 log CFU/g). The colony count decreased slightly (0.2-1 log CFU/g reduction) with all botanical extract treatments (A-C) over time, reaching 5.0 log CFU/g at day 30.

The colony counts of *Kluyveromyces marxianus* for the no-treatment group (+) and the shredded cheese treated with 1.25% botanical extract (A) showed a gradual increase over 30-day storage, reaching a count of 6.2 and 6.6 log CFU/g, respectively. On the other hand, sample treated with 2.5% and 5% botanical extract (B and C) maintained the initial inoculum after 30 days of storage. The colony count of natamycin (D and E) treatments decreased over time, where natamycin 400 ppm (E) reached an undetectable level on day 30. These results demonstrated that no treatment (+) and 1.25% botanical extract (A) supported the growth of *K. marxianus*. In comparison, treatment with 2.5% and 5% botanical extract and natamycin (B-E) either maintained or decreased the growth of *K. marxianus* over 30 days.

Thus, compared with natamycin, the BE-containing anticaking agents were more effective in controlling mold (*P. chrysogenum*) growth and less effective in inhibiting yeast growth (*K. marxianus*) in this sample set.

Mold/Yeast Growth in Mozzarella Cheese

Regarding *Penicillium chrysogenum* growth, the no antimicrobials group (+) and natamycin treatments (D and E) showed a gradual increase of growth over 30 days. Botanical extract achieved 2.7, 0.6, and 1.5 log CFU/g reduction for anticaking agents containing 1.25%, 2.5%, and 5% botanical extract (A-C), respectively.

Regarding *Kluyveromyces marxianus* growth, the no-antimicrobials group (+) exhibited a gradual increase of colony count over 30 days. Treatment groups (A-E) showed similar inhibitory effects as in the mozzarella cheese samples. The colony counts remained relatively unchanged throughout the 30-day storage. Compared with natamycin, the botanical extract was more effective in reducing mold (*P. chrysogenum*) growth and performed similarly at inhibiting yeast (*K. marxianus*).

In conclusion, both mold and yeast growth continued to increase in no-antimicrobials treated group (+) over 30 days of storage at 4° C. Treatment natamycin 200 and 400 ppm (D and E) inhibited *K. marxianus* on both cheeses but failed to inhibit *P. chrysogenum* on both cheeses. Treatment botanical extract (A-C) did not support the growth of *P. chrysogenum* or *K. marxianus* on either type of cheese sample after 30 days of storage at 4° C., except for the strong growth of *K. marxianus* treated with anticaking agent containing 1.25% botanical extract (A) observed on day 30.

Overall, Studies 1-5 demonstrated the antimicrobial capacity of botanical extract, which can replace natamycin in anticaking agents:

(a) Compared with natamycin, at an equivalent concentration level, botanical extract performed similarly in preventing visible mold growth in shredded cheese caused by (1) the mold/yeast naturally presented in cheese and (2) the commensal flora existing during manufacture.

(b) The laboratory results showed that botanical extract is an effective antimicrobial agent that works against multiple strains of mold/yeast (*Aspergillus niger, Saccharomyces cerevisiae, Penicillium crustosum,* and *Kluyveromyces marxianus*) and outperformed natamycin at various levels.

All references, patents, or applications, U.S. or foreign, cited in the application are hereby incorporated by reference as if written herein in their entireties. Where any inconsistencies arise, the material disclosed herein controls.

From the foregoing description, one skilled in the art can easily ascertain the essential characteristics of this invention. Then, without departing from the spirit and scope thereof, one can make various changes and modifications of the invention to adapt it to various usages and conditions.

What is claimed is:

1. An anticaking agent for cheese, comprising 49-99 wt. % starch, 0-1 wt. % mineral oil, 0-1 wt. % silica, and 0.5-20 wt. % of a botanical extract from *Sorbus*, the botanical extract comprising sorbic acid and some non-phenolic compounds.

2. The anticaking agent of claim 1, wherein *Sorbus* is chosen from *Sorbus aucuparia, Sorbus americana, Sorbus aria, Sorbus alnifolia, Sorbus domestica, Sorbus torminalis,* and *Sorbus chamaemespilus.*

3. The anticaking agent of claim 2, wherein *Sorbus* is *Sorbus aucuparia.*

4. The anticaking agent of claim 1, wherein the starch is chosen from potato starch, corn starch, tapioca starch, and combinations thereof.

5. The anticaking agent of claim 1, when applied at a loading of between 3 wt. % and 5 wt. % relative to divided cheddar cheese, has little to no visibility on the divided cheddar cheese, prevents caking of the divided cheddar cheese, and browns similarly to the divided cheddar cheese without the anticaking agent when baked in an impinger oven at between 425° F. and 450° F. for 5 minutes.

6. The anticaking agent of claim 1, wherein the some non-phenolic compounds comprises an aliphatic acid or vitamin.

7. The anticaking agent of claim 1, wherein the some non-phenolic compounds enhances antifungal activity of the botanical extract additively or synergistically.

8. The anticaking agent of claim 1, wherein the botanical extract is isolated from rowanberry pomace.

9. An anticaking agent comprising:
21-70 wt. % starch chosen from corn starch, potato starch, tapioca starch, and combinations thereof;
0.5-10 wt. % of the botanical extract from *Sorbus*, the botanical extract comprising sorbic acid and some non-phenolic compounds;
0-1 wt. % mineral oil;
0-1 wt. % silica;
5-30 wt. % reducing sugar;
0.04-0.8 wt. % glucose oxidase; and
0-2 wt. % salt chosen from sodium chloride, calcium chloride, and magnesium chloride.

10. An anticaking agent comprising:
46-70 wt. % one or more dairy ingredients chosen from milk permeate powder, whey permeate powder, dried whey, and combinations thereof;
30-64 wt. % one or more non-dairy ingredients chosen from cellulose, sugarcane fiber, calcium sulfate, calcium phosphate, dicalcium phosphate, silicon dioxide, starch, dextrose monohydrate, glucose oxidase, potassium sorbate, mineral oil, high oleic sunflower oil, and combinations thereof; and
0.5-10 wt. % of the botanical extract from *Sorbus*, the botanical extract comprising sorbic acid and some non-phenolic compounds.

11. The anticaking agent of claim 10, wherein the one or more dairy ingredients is milk permeate powder or whey permeate powder.

12. The anticaking agent of claim 10, wherein the one or more dairy ingredients is dried whey, comprising 60-65 wt. % of the anticaking agent.

13. The anticaking agent of claim 10, comprising 2-15 wt. % calcium sulfate.

14. The anticaking agent of claim 10, comprising 9-40 wt. % cellulose.

15. The anticaking agent of claim 10, comprising starch.

16. The anticaking agent of claim 10, wherein the starch is chosen from corn starch, potato starch, tapioca starch, and combinations thereof.

17. The anticaking agent of claim 10, comprising 25-35 wt. % sugarcane fiber.

18. The anticaking agent of claim 10, comprising 5-20 wt. % dextrose and 0.04-0.05 wt. % glucose oxidase.

* * * * *